US011773772B2

(12) United States Patent
Aguilar Cuéllar et al.

(10) Patent No.: US 11,773,772 B2
(45) Date of Patent: Oct. 3, 2023

(54) SYSTEM AND METHOD FOR INSTALLATION OR REMOVAL OF ONE OR MORE COMBUSTION CANS

(71) Applicant: General Electric Company, Schenectady, NY (US)

(72) Inventors: Artemio Josue Aguilar Cuéllar, Queretaro (MX); Humberto Sanchez Moreno, Queretaro (MX); Alston Ilford Scipio, Mableton, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/379,052

(22) Filed: Jul. 19, 2021

(65) Prior Publication Data

US 2023/0018703 A1 Jan. 19, 2023

(51) Int. Cl.
*F02C 3/14* (2006.01)

(52) U.S. Cl.
CPC ............ *F02C 3/14* (2013.01); *F05D 2220/32* (2013.01); *F05D 2230/68* (2013.01)

(58) Field of Classification Search
CPC ..... F05D 2230/32; F05D 2230/68; F02C 3/14
See application file for complete search history.

(56) References Cited

U.S. PATENT DOCUMENTS

| 5,911,680 | A | 6/1999 | Takeoka |
| 6,141,862 | A | 11/2000 | Matsui et al. |
| 8,713,776 | B2 | 5/2014 | Herbold |
| 8,782,865 | B2 | 7/2014 | Gerengi |
| 9,404,390 | B2 | 8/2016 | Griese et al. |
| 10,174,637 | B2 | 1/2019 | Imfeld et al. |
| 10,208,627 | B2 | 2/2019 | Heard et al. |
| 10,934,893 | B2 | 3/2021 | Kolvick et al. |
| 2016/0265440 | A1 | 9/2016 | Jorgensen et al. |
| 2016/0363323 | A1 | 12/2016 | Mogle et al. |

(Continued)

FOREIGN PATENT DOCUMENTS

| EP | 3178771 A1 | 6/2017 |
| EP | 3179168 A1 | 6/2017 |
| EP | 2993314 B1 | 11/2017 |

(Continued)

OTHER PUBLICATIONS

European Search Report Corresponding to Application No. 2218776 dated Dec. 20, 2022.

*Primary Examiner* — Moshe Wilensky
(74) *Attorney, Agent, or Firm* — Dority & Manning, P.A.

(57) ABSTRACT

A system includes an annular track that surrounds the turbomachine. The annular track includes an upper rail portion and a lower rail portion removably coupled to one another. The system further includes a drive assembly operably coupled to the annular track. The drive assembly includes a drive chain that extends along the annular track. The system further includes a plurality of carts rotatably coupled to the annular track and connected to the drive chain such that operation of the drive assembly alters a circumferential position of the plurality of carts with respect to an axial centerline of the turbomachine. The system further includes a plurality of combustion can cradle assemblies each coupled to a respective cart of the plurality of carts. Each combustion can cradle assembly of the plurality of combustion can cradle assemblies is configured to removably couple to a combustion can of the one or more combustion cans.

18 Claims, 18 Drawing Sheets

(56) References Cited

U.S. PATENT DOCUMENTS

2017/0167298 A1    6/2017   Kolvick et al.
2017/0167299 A1    6/2017   Heard et al.

FOREIGN PATENT DOCUMENTS

| KR | 102138722 B1    | 7/2020 |
| WO | WO2017/116242 A1 | 7/2017 |
| WO | WO2017/116244 A1 | 7/2017 |

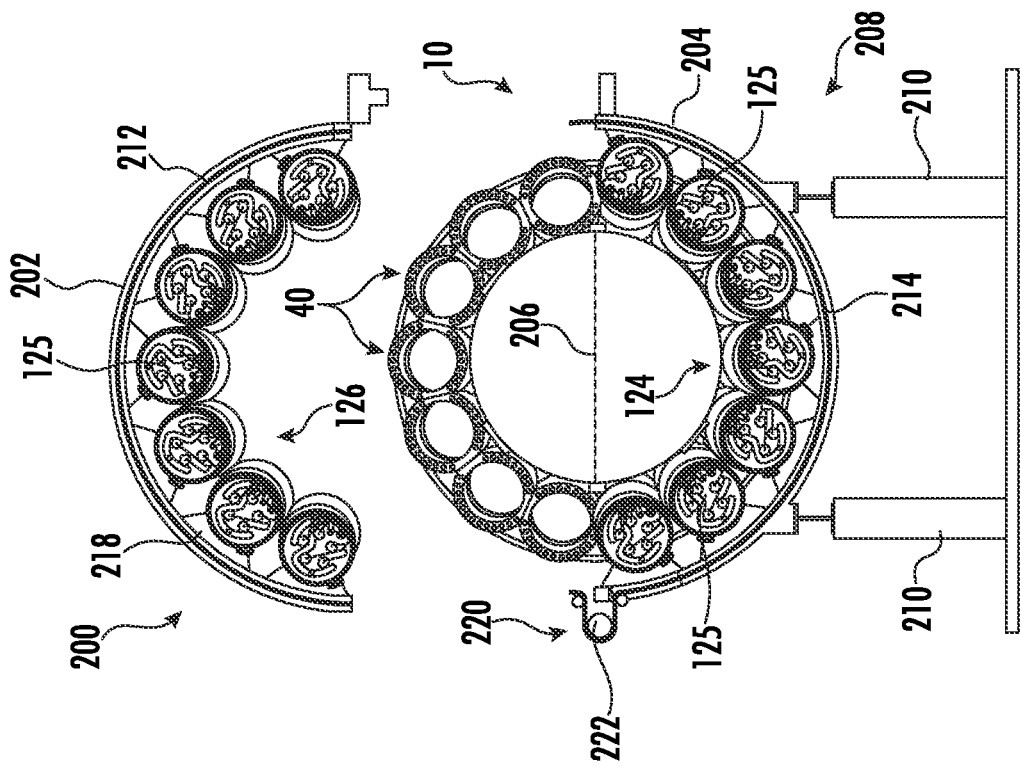
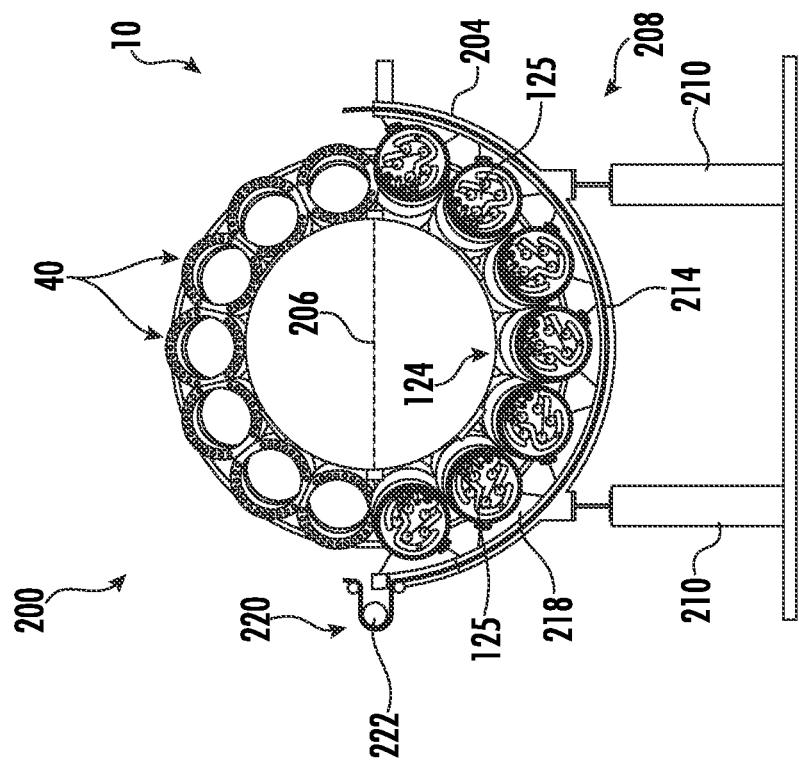

SYSTEM AND METHOD FOR INSTALLATION OR REMOVAL OF ONE OR MORE COMBUSTION CANS

FIELD

The present disclosure relates generally to assemblies and methods for installing and/or removing combustion cans from a turbomachine. In particular, the present disclosure relates to systems and methods for installing and/or removing combustion cans from the entirety of a turbomachine combustion section.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

More specifically, the combustion section mixes large quantities of fuel and compressed air and burns the resulting mixture. The combustion section of a gas turbines can include an annular array of cylindrical combustion "cans" in which air and fuel are mixed and combustion occurs. Compressed air from an axial compressor flows into the combustor. Fuel is injected through fuel nozzle assemblies mat extend into each can. The mixture of fuel and air bums in a combustion chamber of each can. The combustion gases discharge from each can into a duct that leads to the turbine.

Combustion cans need to be installed during the initial build of the gas turbine and may subsequently be removed during subsequent maintenance activities. However, to install, remove or re-install one or more combustion cans, a significant amount of force may be required to properly lift, position and/or align each combustion can with respect to the gas turbine. Accordingly, alternative systems and methods for installing and removing combustion cans would be welcome in the art.

BRIEF DESCRIPTION

Aspects and advantages of the systems and methods in accordance with the present disclosure will be set forth in part in the following description, or may be obvious from the description, or may be learned through practice of the technology.

In accordance with one embodiment, a system for installation or removal of one or more combustion cans from a combustion section of a turbomachine is provided. The system includes an annular track that surrounds the turbomachine. The annular track includes an upper rail portion and a lower rail portion removably coupled to one another. The system further includes a drive assembly operably coupled to the annular track. The drive assembly includes a drive chain that extends along the annular track. The system further includes a plurality of carts rotatably coupled to the annular track and connected to the drive chain such that operation of the drive assembly alters a circumferential position of the plurality of carts with respect to an axial centerline of the turbomachine. The system further includes a plurality of combustion can cradle assemblies each coupled to a respective cart of the plurality of carts. Each combustion can cradle assembly of the plurality of combustion can cradle assemblies is configured to removably couple to a combustion can of the one or more combustion cans.

In accordance with another embodiment, a method for installation of one or more combustion cans from a combustion section of turbomachine is provided. The method includes positioning a lower rail portion of an annular track partially about a combustion section of a turbomachine. A second portion of a drive chain extends along the lower rail portion. The method further includes lifting an upper rail portion of the annular track. A first portion of the drive chain extends along the upper rail portion. A first plurality of carts movably coupled to the upper rail portion and coupled to the first portion of the drive chain. Each cart of the first plurality of carts coupled to a respective combustion can cradle assembly in a first plurality of combustion can cradle assemblies. Each combustion can cradle assembly in the first plurality of combustion can cradle assemblies is removably coupled to a combustion can in a first plurality of combustion cans. The method further includes coupling the upper rail portion to the lower rail portion. The method further includes coupling the first portion of the drive chain to the second portion of the drive chain. The method further includes operating a drive assembly to move the first plurality of carts from the upper rail portion of the annular track to the lower rail portion of the annular track. The method further includes installing the first plurality of combustion cans into a lower half of the combustion section of the turbomachine.

These and other features, aspects and advantages of the present systems and methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present systems and methods, including the best mode of making and using the present systems and methods, directed to one of ordinary skill in the art, is set forth in the specification, which makes reference to the appended figures, in which:

FIG. 9 illustrates a forward view of system for installing and/or removing one or more combustion cans from a turbomachine in accordance with embodiments of the present disclosure;

FIG. 10 illustrates a forward view of system for installing and/or removing one or more combustion cans from a turbomachine in accordance with embodiments of the present disclosure;

DETAILED DESCRIPTION

Figure 1:
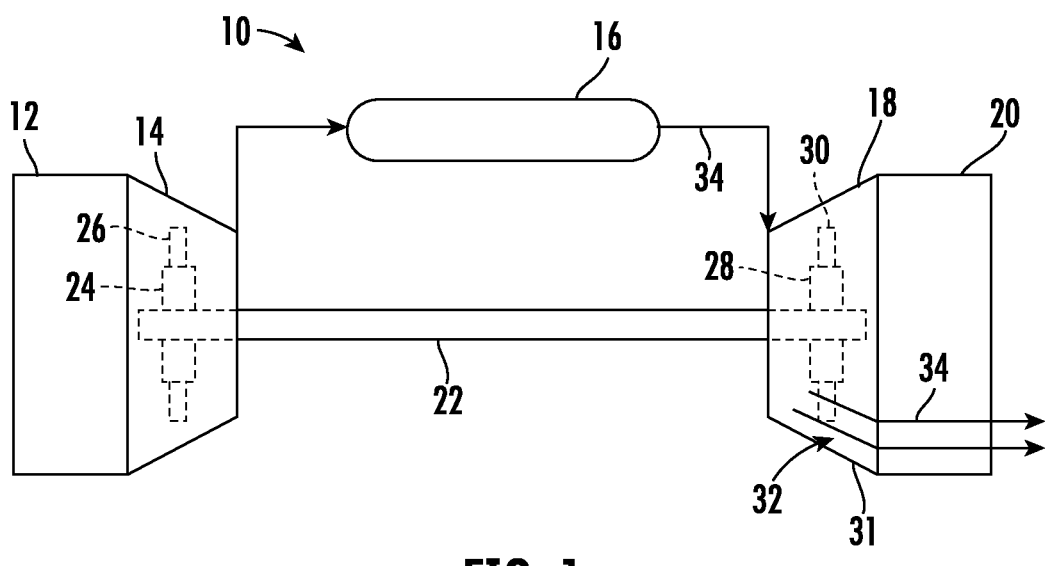
FIG. 1 is a schematic illustration of a turbomachine in accordance with embodiments of the present disclosure.

Reference now will be made in detail to embodiments of the present systems and methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land-based and/or industrial gas turbine unless otherwise specified in the claims. For example, the invention as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors (not shown) within a combustion section 16 disposed downstream of the compressor section 14, a turbine section 18 disposed downstream of the combustion section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustion section 16. The pressurized air is mixed with fuel and burned within each combustor to produce combustion gases 34. The combustion gases 34 flow through the hot gas path 32 from the combustion section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
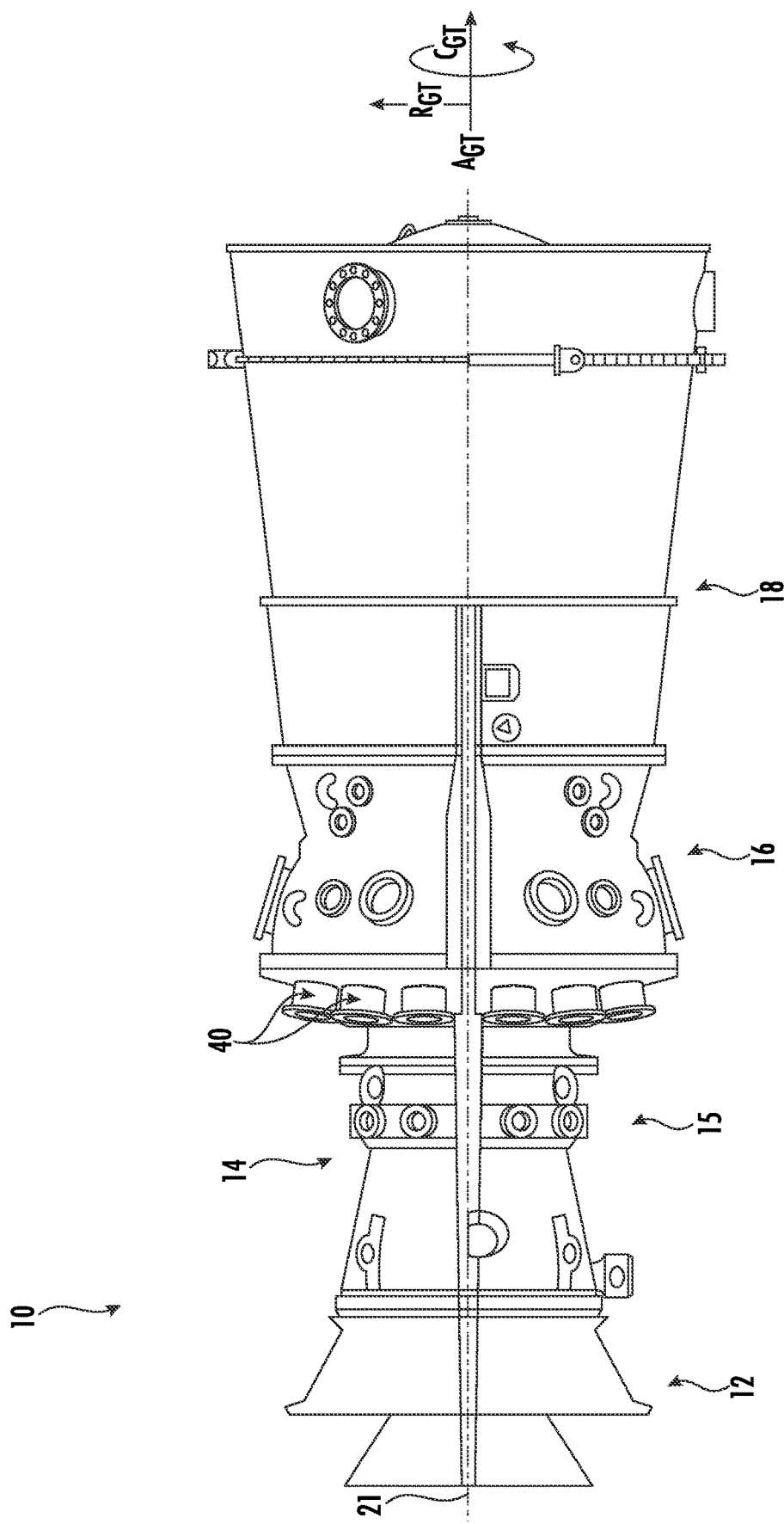
FIG. 2 illustrates a side view of a gas turbine in accordance with embodiments of the present disclosure.

Referring now to FIG. 2, some turbomachines, such as gas turbines, aero-derivatives, or the like, burn a fuel and an air mixture during a combustion process to generate energy. FIG. 2 illustrates an example of a gas turbine 10. Generally, the gas turbine 10 comprises an inlet section 12 that directs an airstream towards a compressor section 14 housed in a compressor casing 15. The airstream is compressed and then discharged to a combustion section 16, where a fuel, such as natural gas, is burned to provide high-energy combustion gases, which drives the turbine section 18. In the turbine section 18, the energy of the hot gases is converted into work, some of which is used to drive the compressor, with the remainder available for useful work to drive a load such as the generator, mechanical drive, or the like (none of which are illustrated).

As shown, the gas turbine 10 may define a cylindrical coordinate system having an axial direction $A_{gt}$ extending along the axial centerline 21, a radial direction $R_{gt}$ perpendicular to the axial centerline 21, and a circumferential direction $C_{gt}$ extending around the axial centerline 21. The upper rail portion 202 may extend along the circumferential direction $C_{gt}$ of the gas turbine 10. The upper rail portion 202 may extend along the circumferential direction $C_{gt}$ of the gas turbine 10 (See FIGS. 6-8).

Figure 3:
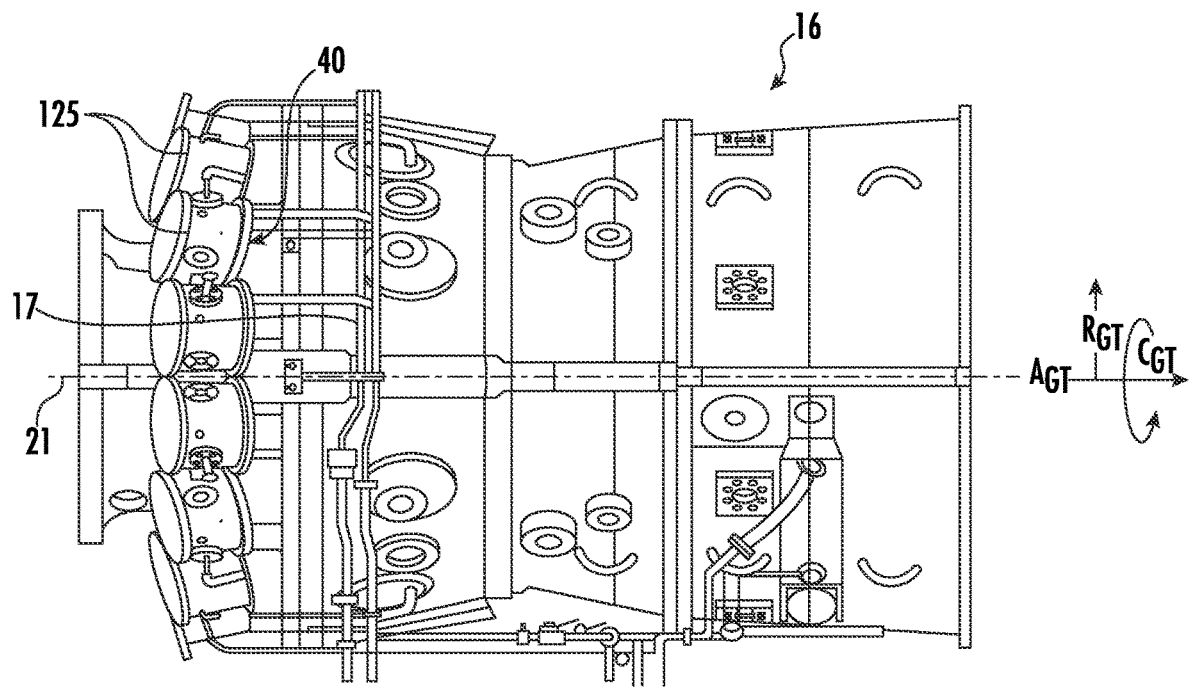
FIG. 3 illustrates a side view of a combustion section of a gas turbine in accordance with embodiments of the present disclosure.

Referring now additionally to FIG. 3, an embodiment of the combustion section 16 may comprise at least one combustor assembly 40. Some gas turbines 10, such as that illustrated in FIG. 2, may comprise a plurality of combustor assemblies 40 disposed in an annular array around a axial centerline 21. Generally, within each combustor assembly 40 (and more specifically, the combustion can 125 of the combustor assembly 40) the aforementioned combustion process occurs. In some embodiments, combustor assemblies 40 can comprise one or more auxiliary systems such as flame detection systems to monitor the flame burning in some of the combustor assemblies 40. Such flame detection systems may be in the form of a flame scanner, a portion of which may be inserted within the combustor assembly 40. Additional or alternative auxiliary systems 17 may similarly be incorporated into combustor assemblies 40 to monitor, control and/or impact one or more of the combustor assembly processes.

Figure 4:
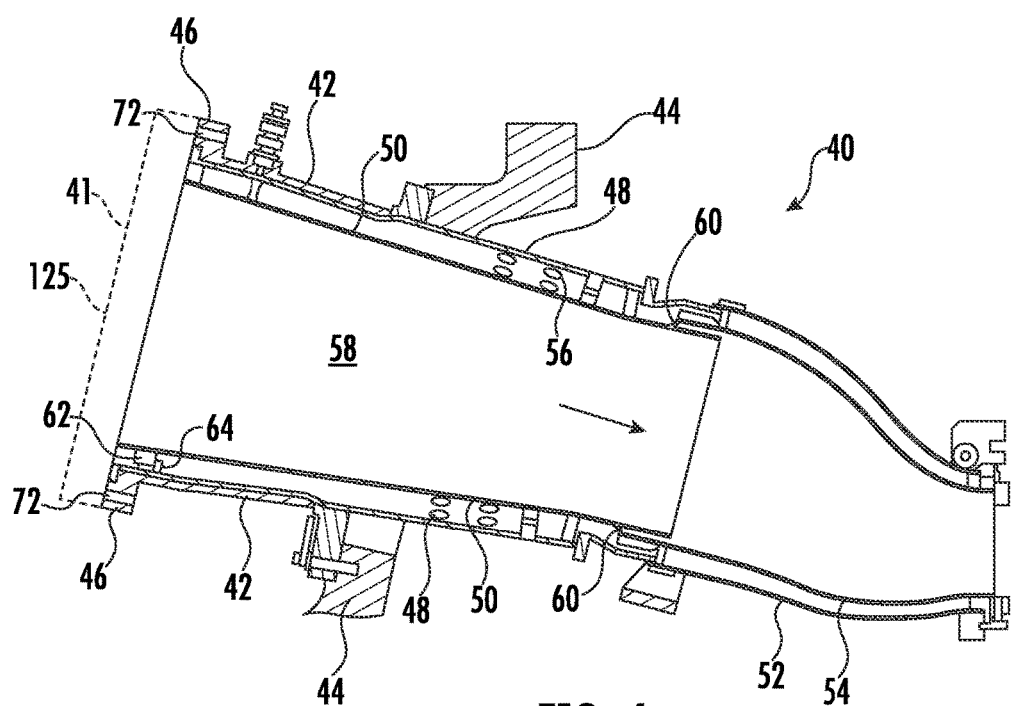
FIG. 4 illustrates a cross-sectional side view of a combustor assembly in accordance with embodiments of the present disclosure.

Referring additionally to FIG. 4, a cross-sectional side view of an embodiment of a combustor assembly 40 of a gas turbine 10 is illustrated. The combustor assembly 40 may generally include at least a combustion can 125 and potentially a substantially cylindrical combustion casing 42 secured to a portion of a gas turbine casing 44, such as a compressor discharge casing or a combustion wrapper casing. As shown, a flange 46 may extend outwardly from an upstream end of the combustion casing 42. The flange 46 may generally be configured such that an end cover assembly 41 of a combustor assembly 40 may be secured to the combustion casing 42. For example, the flange 46 may define a plurality of flange holes 72 for attaching the end cover assembly 41 to the combustion casing 42.

In some embodiments, the combustor assembly 40 may also include an internal flow sleeve 48 and/or a combustion liner 50 substantially concentrically arranged within the flow sleeve 48. The combustor assembly 40 may comprise a unibody combustor assembly 40 comprising the combustion can 125 and at least one of the flow sleeve 48 or combustion liner 50 connected to the combustion can 125 as a single pre-assembled structure, or the combustor assembly 40 may comprise an assembly where the combustion can 125, flow sleeve 48 and combustion liner 50 all connect directly to the gas turbine 10 such as to the turbine casing 44 (sometimes referred to as a combustion discharge casing or "CDC"). For example, the flow sleeve 48 and the combustion liner 50 may extend, at their downstream ends, to a double walled transition duct, including an impingement sleeve 52 and a transition piece 54 disposed within the impingement sleeve 52. It should be appreciated that in some embodiments the impingement sleeve 52 and the flow sleeve 48 may be provided with a plurality of air supply holes 56 over a portion of their surfaces, thereby permitting pressurized air from the compressor section 14 to enter the radial space between the combustion liner 50 and the flow sleeve 48.

The combustion liner 50 of the combustor assembly 40 may generally define a substantially cylindrical combustion chamber 58, wherein fuel and air are injected and combusted to produce hot gases of combustion. Additionally, the combustion liner 50 may be coupled at its downstream end to the transition piece 54 such that the combustion liner 50 and the transition piece 54 generally define a flow path for the hot gases of combustion flowing from each combustor assembly 40 to the turbine section 18 of the gas turbine 10.

In some embodiments, such as that illustrated in FIG. 4, the transition piece 54 may be coupled to the downstream end of the combustion liner 50 with a seal 60 (e.g., a compression seal). For example, the seal 60 may be disposed at the overlapping ends of the transition piece 54 and combustion liner 50 to seal the interface between the two components. For example, a seal 60 may comprise a circumferential metal seal configured to be spring/compression loaded between inner and outer diameters of mating parts. It should be appreciated, however, that the interface between the combustion liner 50 and the transition piece 54 need not be sealed with a compression seal 60, but may generally be sealed by any suitable seal known in the art.

In some embodiments, the combustion liner 50 may also include one or more male liner stops 62 that engage one or more female liner stops 64 secured to the flow sleeve 48 or, in combustor assemblies 40 without a flow sleeve 48, the combustion casing 42. In particular, the male liner stops 62 may be adapted to slide into the female liner stops 64 as the combustion liner 50 is installed within the combustor assembly 40 to indicate the proper installation depth of the combustion liner 50 as well as to prevent rotation of the liner 50 during operation of the gas turbine 10. Moreover, it should be appreciated that, in some embodiments, male liner stops 62 may be additionally or alternatively disposed on the flow sleeve 48 or combustion casing while the female liner stops 64 are disposed on the combustion liner 50.

In some embodiments, the combustion liner 50 may first be installed within a combustor assembly 40, by being pushed into the combustor assembly 40. For example, the combustion liner 50 can be pushed into the combustor assembly 40 until a force limits further installation depth into the transition piece 54. With continued reference to FIG. 3, a combustion can 125 can then be installed into each respective combustor assembly 40. Specifically, the combustion can 125 can be positioned, aligned and inserted such that its end cover assembly 41 can then abut against the flange 46 of the combustor assembly 40.

While specific embodiments have been presented herein, it should be appreciated that the combustor assembly 40 may comprise a variety of different components that are assembled in a variety of different orders with respect to the individual connections made with the gas turbine 10. For example, the combustor assembly 40 may be completely assembled prior to installation onto the gas turbine 10 (e.g., a unibody combustor assembly 40), may be partly assembled prior to installation on the gas turbine 10, may be completely assembled while connected to the gas turbine 10, or combinations thereof.

FIGS. 5 through 20 illustrate various aspects or embodiments or a system 200 for installation or removal of one or more combustion cans 125 from a combustion section 16 of a turbomachine in accordance with the present disclosure. As will be discussed, the system 200 may facilitate the installation and/or removal of one or more combustion cans 125 from the combustor assemblies 40 of the gas turbine 10. For example, the system 200 may advantageously be a compact design that allows for one or more combustion cans 125 to be installed, removed, or reinstalled without having to fully disassemble the gas turbine 10. As may be appreciated by those of skill in the art, gas turbines (such as the gas turbine 10) are often crowded with various pipings and external hardware that can make accessing the combustion section (e.g., for installation or removal of one or more combustion cans 125) difficult. The compactness of the system 200 described herein may advantageously be used to install and/or remove combustion cans 125 into a combustor assembly 40 without having to remove external hardware and/or pipings.

Figure 6:
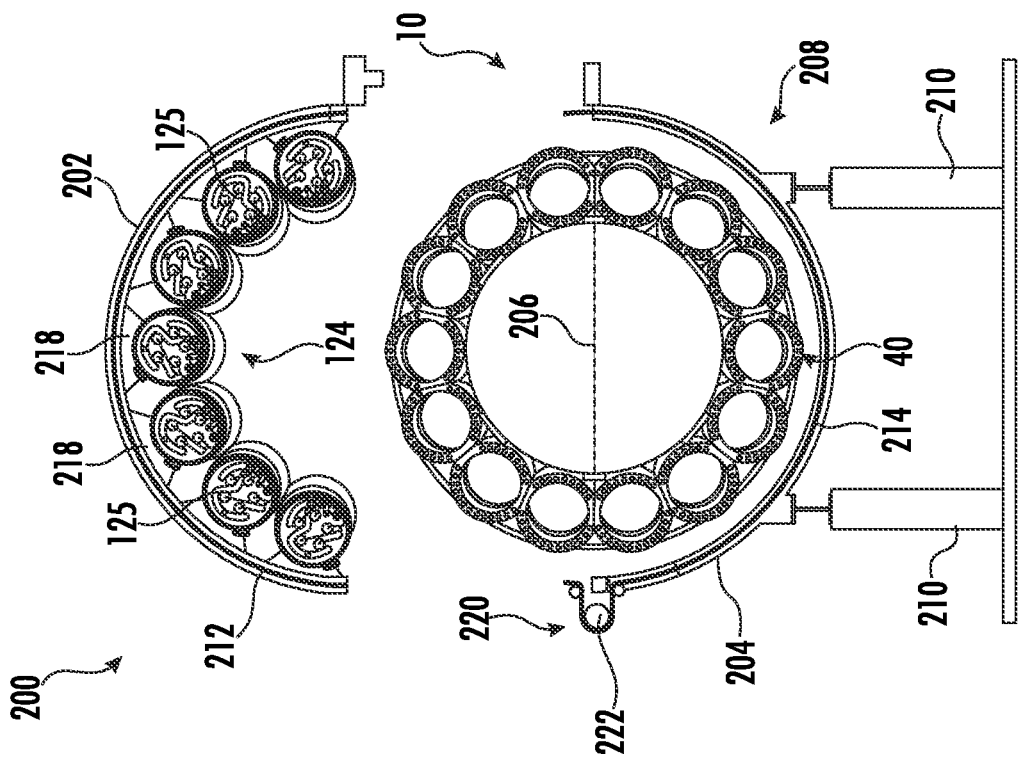
FIG. 6 illustrates a forward view of system for installing and/or removing one or more combustion cans from a turbomachine in accordance with embodiments of the present disclosure.
Figure 5:
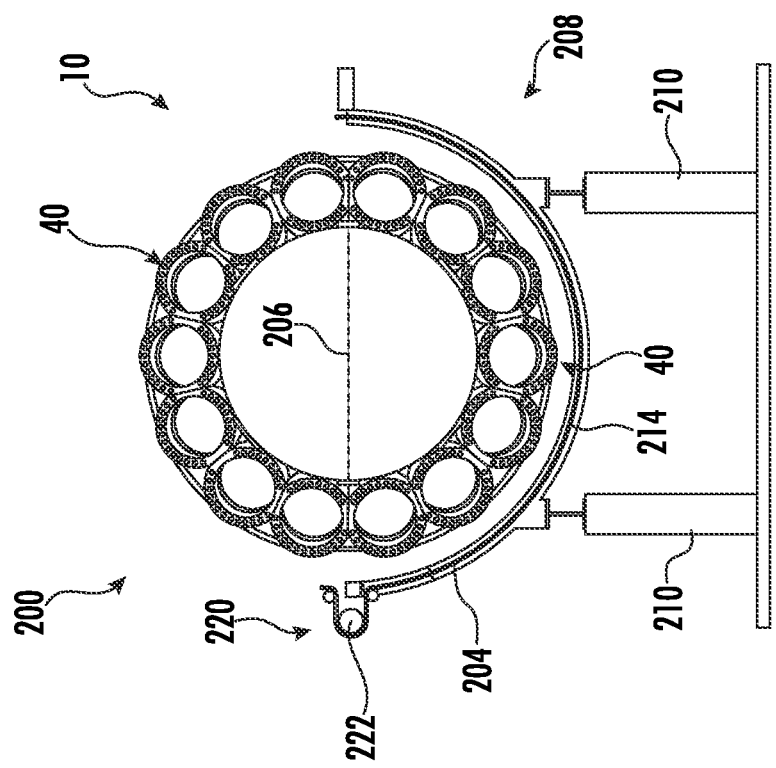
FIG. 5 illustrates a forward view of system for installing and/or removing one or more combustion cans from a turbomachine in accordance with embodiments of the present disclosure.
Figure 7:
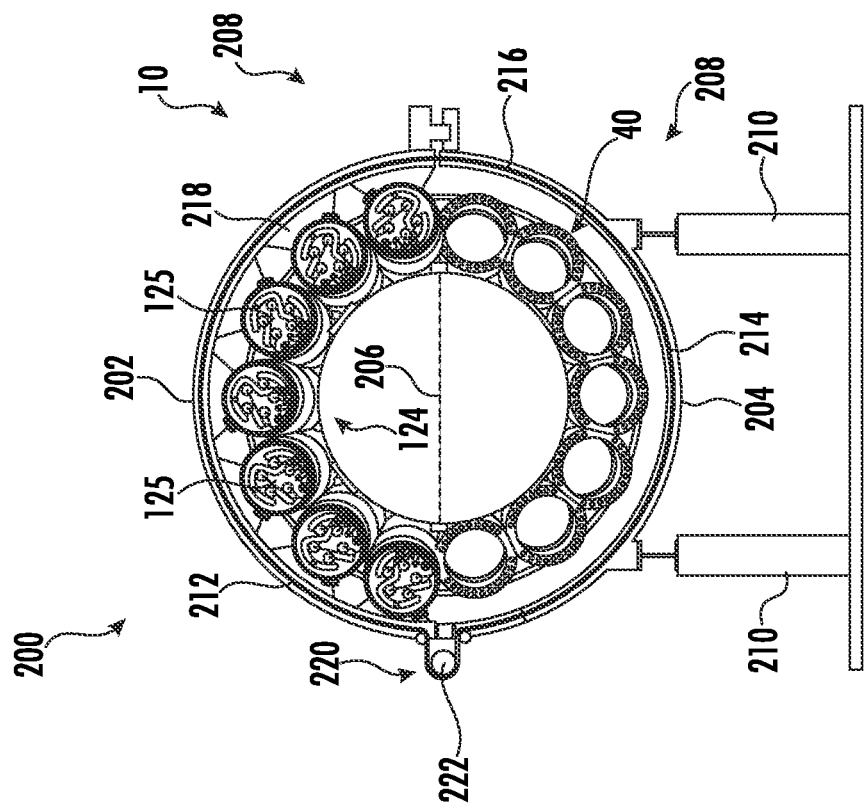
FIG. 7 illustrates a forward view of system for installing and/or removing one or more combustion cans from a turbomachine in accordance with embodiments of the present disclosure.
Figure 12:
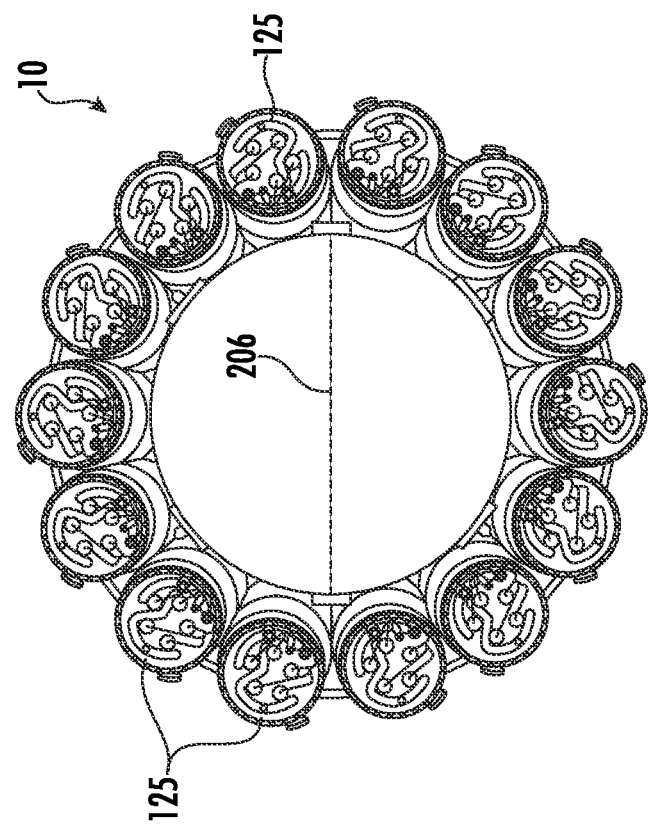
FIG. 12 illustrates a forward view of a combustion section of a gas turbine in accordance with embodiments of the present disclosure.

FIGS. 5 through 12 each illustrate a forward view of a combustion section 16 of a gas turbine 10. More particularly, FIGS. 5 through 12 illustrate the sequential steps of installing combustion cans 125 into the respective combustor assemblies 40 by using the system 200 described herein. For example, in FIG. 5, the combustion section 16 does not have any combustion cans 125 installed into the combustor assemblies 40, but a lower rail portion 204 of an annular track 208 may be positioned at least partially about the gas turbine 10. For example, the lower rail portion 204 of the annular track may be initially assembled and may be supported by one or more vertical legs 210. In FIG. 6, an upper rail portion 202 of the annular track 208, which may be carrying a first plurality 124 of combustion cans 125, may be lifted and lowered onto the lower rail portion 204 of the annular track 208 (e.g., via a crane or other lifting means). As shown, a first portion 212 (or first half) of a drive chain 216 may extend along the upper rail portion 202 during the assembly of the annular track 208, and a second portion 214 (or second half) of the drive chain 216 may extend along the lower rail portion 204 during assembly of the annular track 208. In FIG. 7, the upper rail portion 202 of the annular track 208 may be coupled to the lower rail portion 204, and the first portion 212 of the drive chain 216 may be coupled to the second portion 214 of the drive chain 216. Once coupled, both the drive chain 216 and the annular track 208 may extend along the circumferential direction $C_{gt}$ of the gas turbine 10 entirely around the axial centerline 21 of the gas turbine 10. Additionally, the drive chain 216 may be movable relative to the annular track 208 in the circumferential direction $C_{gt}$. In this way, as discussed in more detail below, the first plurality 124 of combustion cans 125 may be rotatably coupled to the annular track 208 via one or more carts 218, with the one or more carts 218 being attached to the drive chain 216.

Figure 8:
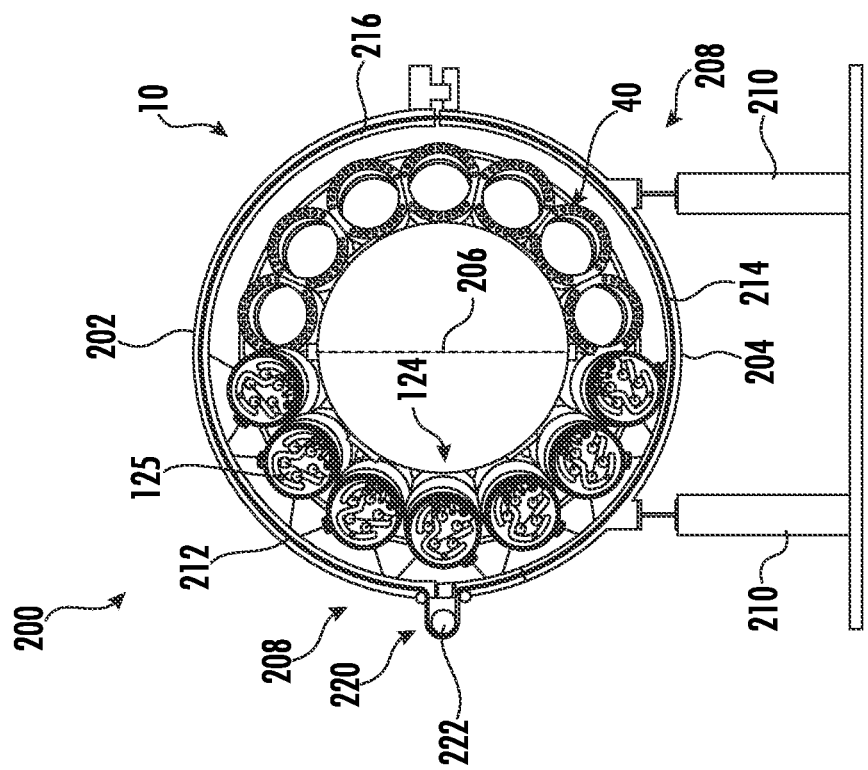
FIG. 8 illustrates a forward view of system for installing and/or removing one or more combustion cans from a turbomachine in accordance with embodiments of the present disclosure.
Figure 11:
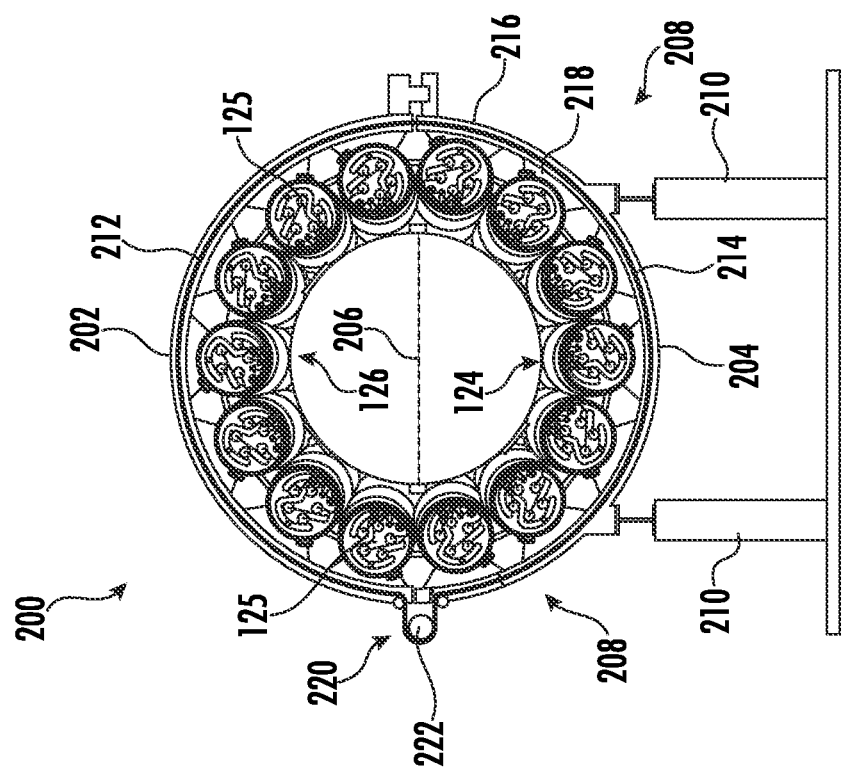
FIG. 11 illustrates a forward view of system for installing and/or removing one or more combustion cans from a turbomachine in accordance with embodiments of the present disclosure.

Subsequently, as illustrated in FIG. 8, a drive assembly 220 coupled to drive chain 216 may be operated to adjust a circumferential position of the first plurality 124 of combustion cans 125 (e.g, operation of the drive assembly 220 moves the drive chain 216, the carts 218, and the first plurality 124 of combustion cans 125). For example, the drive assembly 220 may include a motor 222 coupled to the drive chain 216, such that operation of the motor 222 adjusts a circumferential position of the first plurality 124 of combustion cans 125. In FIG. 9, an operation of the drive assembly 220 may be halted once the first plurality 124 of combustion cans 125 are disposed below the horizontal plane 206 of the gas turbine 10 (e.g., each combustion can coupled to the lower rail portion 204 of the annular track 208). At which point, the upper rail portion 202 may be decoupled from the lower rail portion 204, and the first portion 212 of the drive chain 216 may be decoupled from the second portion 214 of the drive chain 216. As shown in FIG. 10, the upper rail portion 202 of the annular track 208 may be lowered, coupled to a second plurality 126 of combustion cans 125, and subsequently re-lifted (e.g., by a crane or other lifting means). As shown in FIG. 11, the upper rail portion 202 may be recoupled to the lower rail portion 204 of the annular track 208, and the first plurality 124 of combustion cans 125 and the second plurality 126 of combustion cans 125 may be installed into the respective combustor assemblies 40 of the combustion section 16. As a result of the system and method shown and described above with reference to FIGS. 5 through 11, the combustion section 16 shown in FIG. 12 may be yielded (e.g., having all the combustion cans 125 installed into the respective combustor assemblies 40 of the combustion section 16).

FIGS. 13 through 20 each illustrate one or more exemplary features or aspects that may be incorporated into the system 200 for installing and/or removing one or more combustion cans 125 discussed above with reference to FIGS. 5 through 12. As shown in collectively by FIGS. 5 through 21, the system 200 may include an annular track 208 surrounding the turbomachine (e.g., the gas turbine 10). For example, the annular track 208 may extend 360° around the axial centerline 21 of the gas turbine 10. Particularly, the annular track 208 may be disposed around the combustion section 16 of the gas turbine, such that the annular track 208 surrounds the combustor assemblies 40 of the combustion section 16. For example, the annular track 208 may extend along a circular path having a center point along the axial centerline 21 of the gas turbine 10.

In exemplary embodiments, the annular track 208 may an upper rail portion 202 and a lower rail portion 204 removably coupled to one another. For example, the upper rail portion 202 may couple to the lower rail portion 204, such that the lower rail portion 204 and the upper rail portion 202 collectively surround the axial centerline 21 of the gas turbine 10. In many embodiments, the upper rail portion 202 and the lower rail portion 204 of the annular track 208 may collectively surround the gas turbine 10 radially outward from the combustor assemblies 40 with respect to the radial direction $R_{gt}$ of the gas turbine 10. In many embodiments, a horizontal plane 206 that is parallel to the ground may divides the combustion section 16 into an upper half and a lower half. For example, the lower rail portion 204 may extend around the lower half of the combustion section 16 (e.g., about 180° below the horizontal plane), and the upper rail portion 204 may extend around the upper half of the combustion section (e.g., about 180° above the horizontal plane 206). In exemplary embodiments, the upper rail portion 202 may extend about the upper half of the combustion section 16, such that combustion cans 125 coupled to the upper rail portion 202 may be installed into a combustor assembly 40 in the upper half of the combustion section 16. Similarly, the lower rail portion 204 may extend about the lower half of the combustion section 16, such that combustion cans 125 coupled to the lower rail 204 may be installed in a combustor assembly 40 in the lower half of the combustion section 16.

Figure 16:
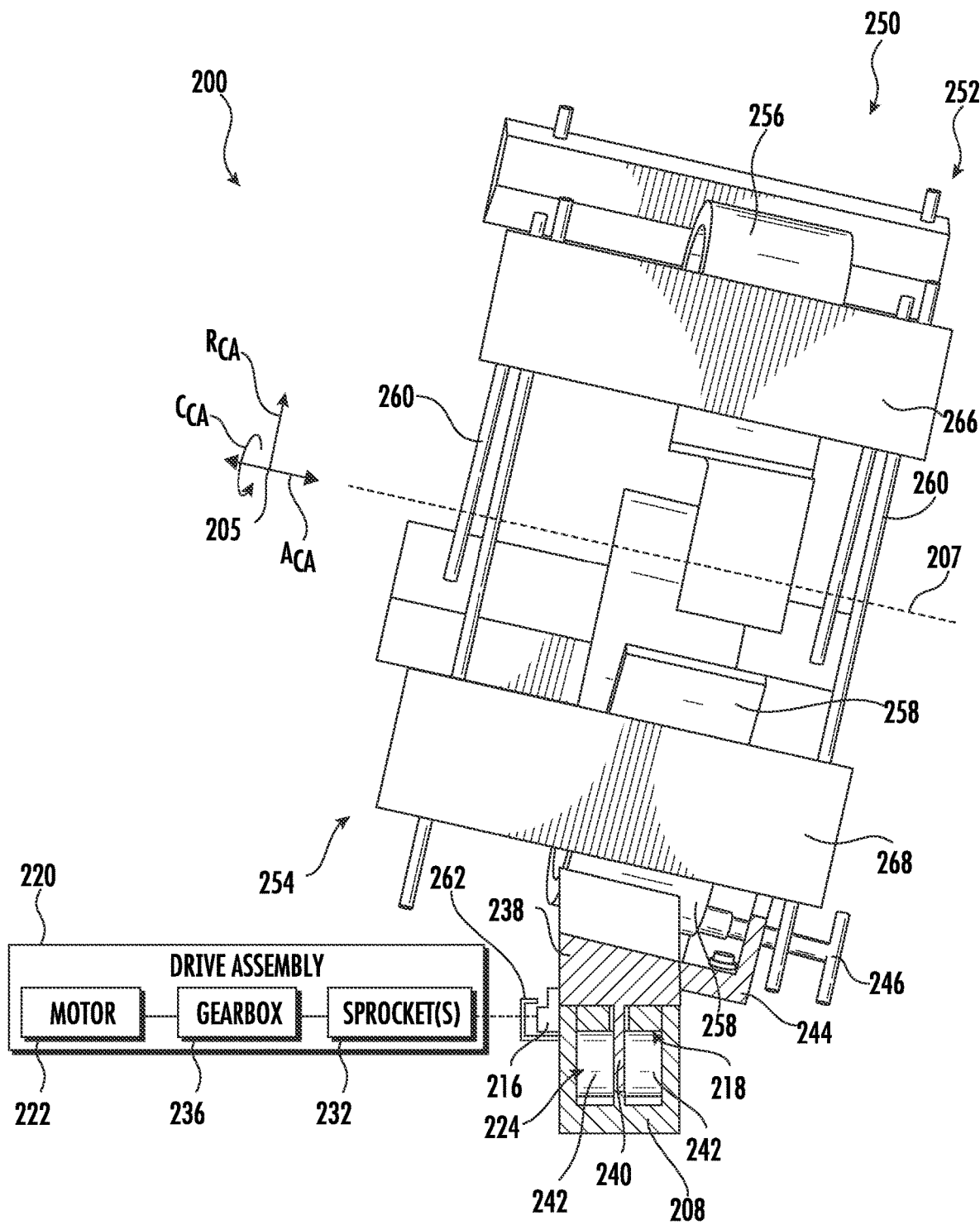
FIG. 16 illustrates an enlarged cross sectional view of the system show in FIGS. 1 through 12 in accordance with embodiments of the present disclosure.
Figure 18:
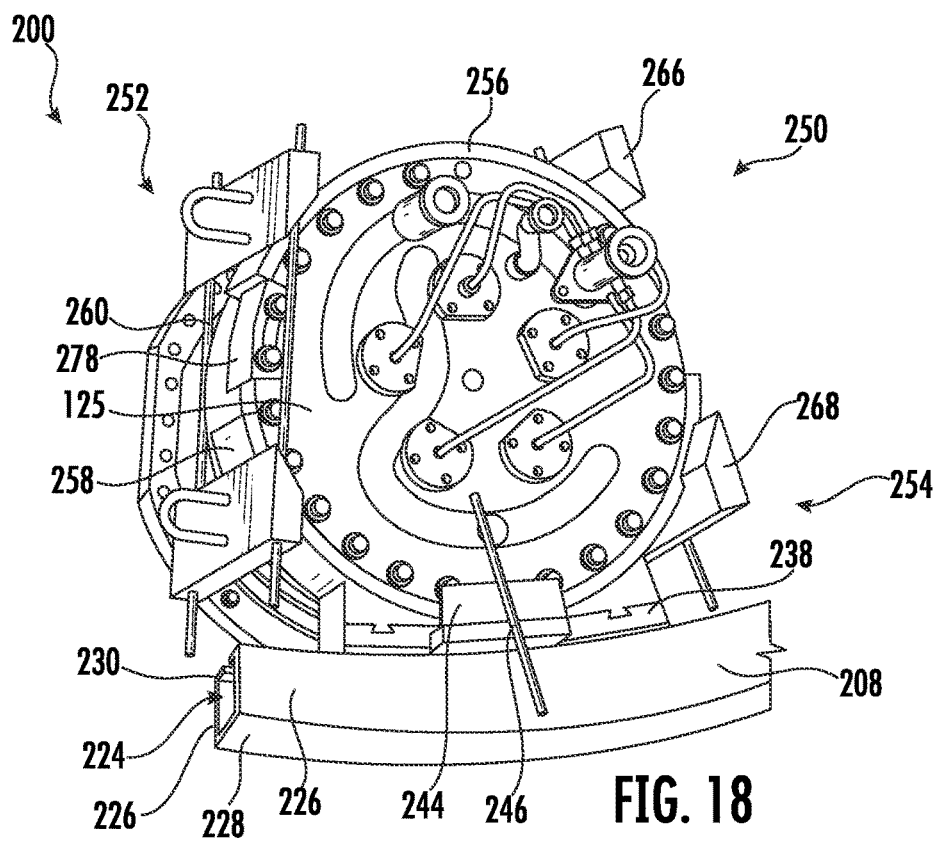
FIG. 18 illustrates an enlarged view of the system show in FIGS. 1 through 12 in accordance with embodiments of the present disclosure.

As shown best in FIGS. 16 and 18, in some embodiments, the annular track 208 (including the upper rail portion 202 and the lower rail portion 204) may define an interior 224. For example, the annular track 208 may include side walls 226 spaced apart from one another, a solid outer wall 228 (e.g., a radially outer wall with respect to the radial direction $R_{gt}$ of the gas turbine 10), and an open inner wall 230 (e.g., radially inner wall with respect to the radial direction $R_{gt}$ of the gas turbine 10). The side walls 226, the solid outer wall 228, and the open inner wall 230 may collectively define the interior 224. In exemplary embodiments, the open inner wall 230 may define a circumferential gap that extends both axially and circumferentially with respect to the axial centerline 21 of the gas turbine 10. Particularly, both the circumferential gap and the interior 224 may extend circumferentially through the entire annular track 208. In various implementations, the plurality of carts 218 may be rotatably mounted to the annular track 208 (e.g., via one or more wheels 242 disposed in the interior 224). For example, a portion of each cart 218 may extend through the circumferential gap and into the interior 224 of the annular track 208, where one or more wheels 242 may provide each cart 218 with the ability to move circumferentially around the annular track 208 with respect to an axial centerline of the gas turbine 10.

In exemplary embodiments, the system 200 may further include a drive assembly 220 operably coupled to the annular track 208. The drive assembly 220 may include the drive chain 216 that extends along the annular track 208. In exemplary embodiments, the drive chain 216 may be a metal roller chain (such as a steel bush roller chain) having a plurality of inner links, outer links, and rollers. In various implementations, the drive assembly 220 may include one or more sprockets 232 rotatably coupled to the drive chain 216. Particularly, the one or more sprockets 232 may be coupled to the drive chain 216 such that a rotation of the sprocket 232 causes translational movement of the drive chain 216.

In many embodiments, the drive assembly 220 may includes a motor 222 (such as an electric motor, a hydraulic motor, gas motor, or other suitable motor for powering the drive assembly 220). The motor 222 may include an output shaft 234 to a gearbox 236. The gearbox 236 may be connected to the motor 222 and connected to the one or more sprockets 232. For example, the gearbox 236 may include an input shaft connected to an output shaft of the motor 222. Additionally, the gearbox 236 may include an output shaft coupled to the sprocket 232, and the sprocket 232 may be coupled to the drive chain 216 such that operation of the motor 222 alters a circumferential position of the plurality of carts 218 with respect to an axial centerline 21 of the turbomachine. For example, the output shaft of the gearbox 236 may be coupled (e.g., fixedly coupled via welding or brazing) to a sprocket 232 of the one or more sprockets 232, such that the sprocket 232 of the one or more sprockets 232 rotates with the output shaft of the gearbox 236. In this way, the rotational output of the motor 222 drives the gearbox 236, which turns the sprocket 232 and causes a translational movement of the drive chain 216 in the circumferential direction $C_{gt}$ of the gas turbine 10.

In many embodiments, the system 200 may further include a plurality of carts 218 rotatably coupled to the annular track 208 and connected to the drive chain 216 such that operation of the drive assembly 220 alters a circumferential position of the plurality of carts 218 with respect to an axial centerline of the turbomachine (e.g., the gas turbine 10). In many embodiments, each cart 218 of the plurality of carts 218 may include a main body 238 and a track member 240 extending from the main body 238 and into the annular track 208. For example, the track member 240 may extend from the main body 238 of the cart 218, through the circumferential gap, and into the interior 224 of the annular track 208. In many embodiments, each cart 218 of the plurality of carts 218 may include one or more wheels 242 rotatably coupled to the cart 218 (e.g., via one or more pins or bearings). Particularly, the one or more wheels 242 may be coupled to the track member 240 of each cart 218, such that the wheels 242 are disposed within the interior 224 of the annular track 208 and in rotatable contact with the annular track 208.

In many embodiments, as shown best in FIG. 16, the cart 218 may include a tab portion 244 extending from the main body 238 (e.g., first axially from the main body 238 then radially with respect to an axial centerline 207 of the combustion can cradle assembly 250). Additionally, a jacking bolt 246 may extends through the tab portion 244 and into the combustion can cradle assembly 250, such that rotation of the jacking bolt 246 adjusts an axial position of the combustion can cradle assembly 250 (e.g., along the axial direction $A_{CA}$). For example, the jacking bolt 246 may be threadably received by the lower pressure plate 258 of the combustion can cradle assembly 250, such that rotation of the jacking bolt 246 alters an axial position of the combustion can cradle assembly 250 relative to the cart 218.

Figure 13:
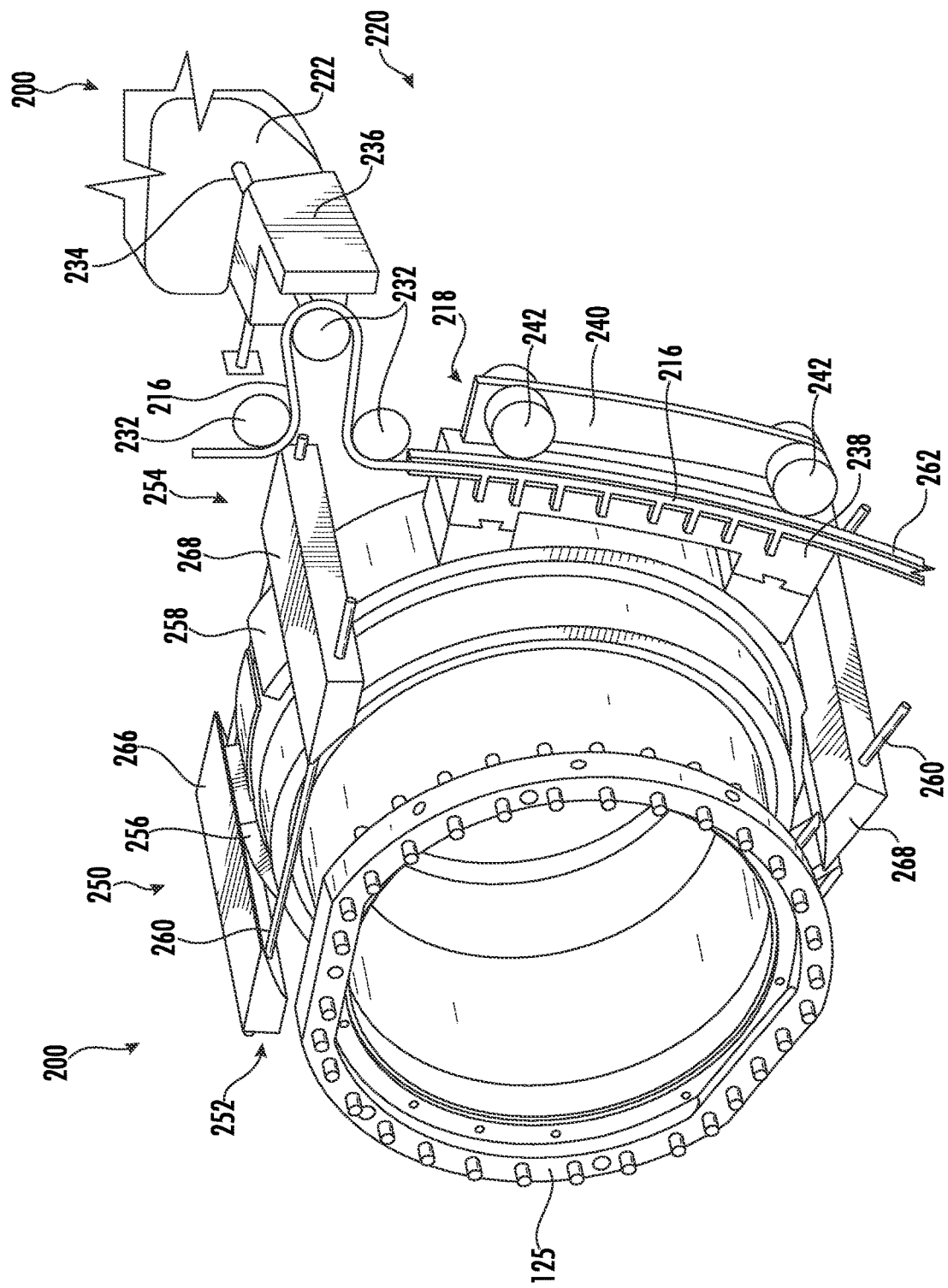
FIG. 13 illustrates an enlarged view of the system shown in FIGS. 1 through 12 in accordance with embodiments of the present disclosure.
Figure 14:
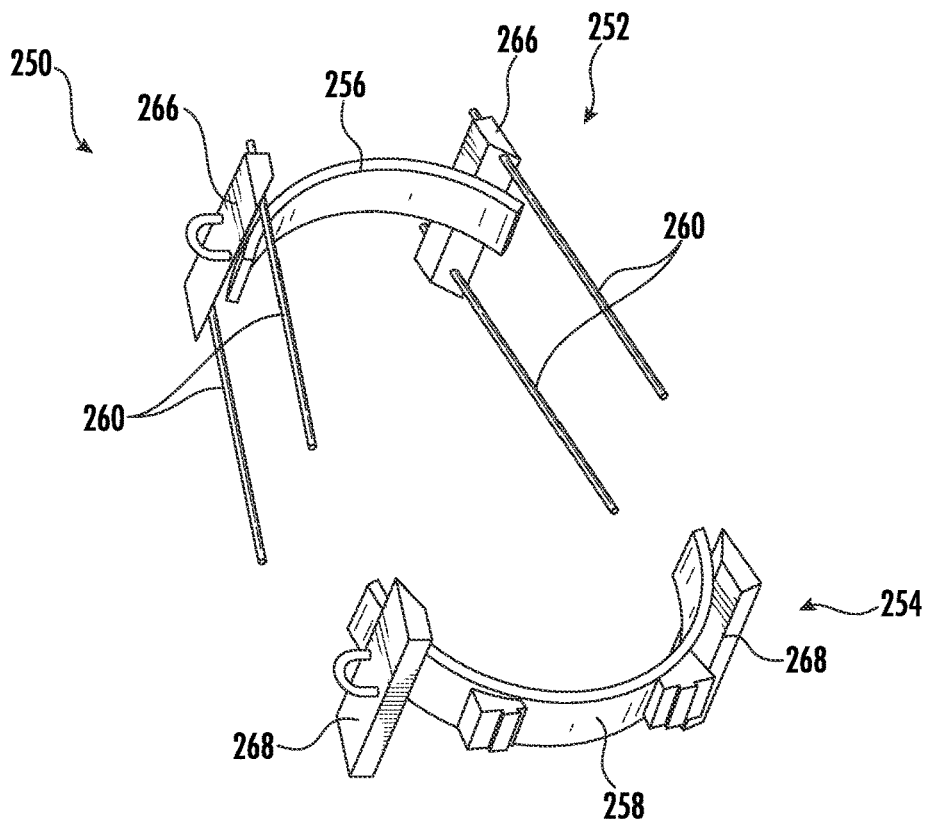
FIG. 14 illustrates an exploded view of a combustion can cradle assembly in accordance with embodiments of the present disclosure.
Figure 15:
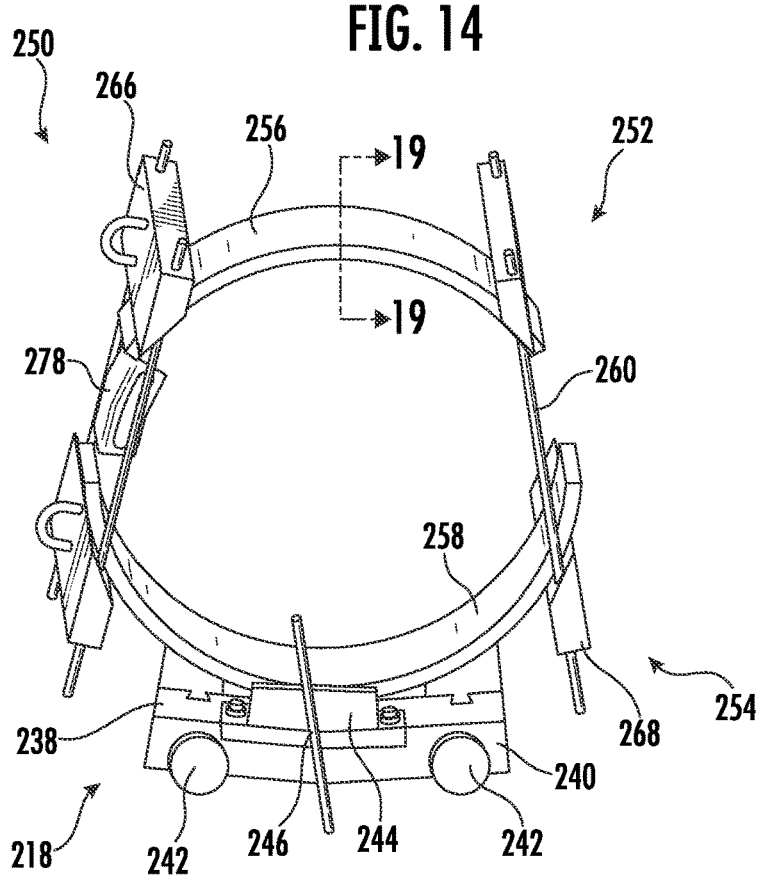
FIG. 15 illustrates a perspective view of a combustion can cradle assembly coupled to a cart in accordance with embodiments of the present disclosure.

In exemplary embodiments, as shown throughout FIGS. 13 through 18, the system 200 may further include a plurality of combustion can cradle assemblies 250 each coupled to a respective cart 218 of the plurality of carts 218. each combustion can cradle assembly 250 of the plurality of combustion can cradle assemblies 250 may be configured to removably couple to a combustion can 125. For example, each combustion can cradle assembly 250 may removably couple to and securely hold a combustion can 125. Particularly, FIG. 15 illustrates a perspective view of a combustion can cradle assembly 250 coupled to a cart 218, FIG. 14 illustrates an exploded view of a combustion can cradle assembly 250 decoupled from the cart 218.

Additionally, each of the combustion can cradle assemblies 250 may be configured to move in any direction relative to the cart 218, in order to adjust a position of the combustion can to which it is attached for alignment with the respective combustor assembly 40. For example, the annular track 208, the carts 218, and the drive assembly 220 may be operable to adjust a circumferential position of the combustion can cradle assemblies 250 along the circumferential direction $C_{gt}$ of the gas turbine 10, in order to circumferentially align each combustion can 125 with a respective combustor assembly 40 for installation therein. Once the combustion can cradle assemblies 250 have each been aligned with a respective combustor assembly 40 (e.g., by movement of the carts 218 along the annular track 208), each combustion can may still require finite adjustments to be fully aligned with the respective combustor assembly 40 to which it will be attached. The combustor cradle assembly 250 described herein advantageously allows for the finite movements to be made without excessive force on the operator.

FIG. 16 illustrates a cross-sectional enlarged view of the system 200 from along the circumferential direction $C_{gt}$ of the gas turbine 10. As shown, each combustion can cradle assembly 250 of the plurality of combustion can cradle assemblies 250 defines a cylindrical coordinate system 205 having an axial direction $A_{CA}$ extending along an axial centerline 207 of the combustion can cradle assembly 250, a radial direction $R_{CA}$ extending perpendicularly to the axial centerline 207 of the combustion can cradle assembly 250, and a circumferential direction $C_{CA}$ extending around the axial centerline 207 of the combustion can cradle assembly 250. When the combustion can cradle assembly 250 is coupled to a combustion can 125, the axial centerline 207 of the combustion can cradle assembly 250 may coincide with an axial centerline of the combustion can 125 (such that they share a common axial centerline). Each combustion can cradle assembly 250 of the plurality of combustion can cradle assemblies 250 may be configured to move the along any of the axial direction $A_{CA}$, the radial direction $R_{CA}$, and/or the circumferential direction $C_{CA}$ relative to the annular track 208 to adjust a position of the combustion can 125 contained therein.

Figure 17:
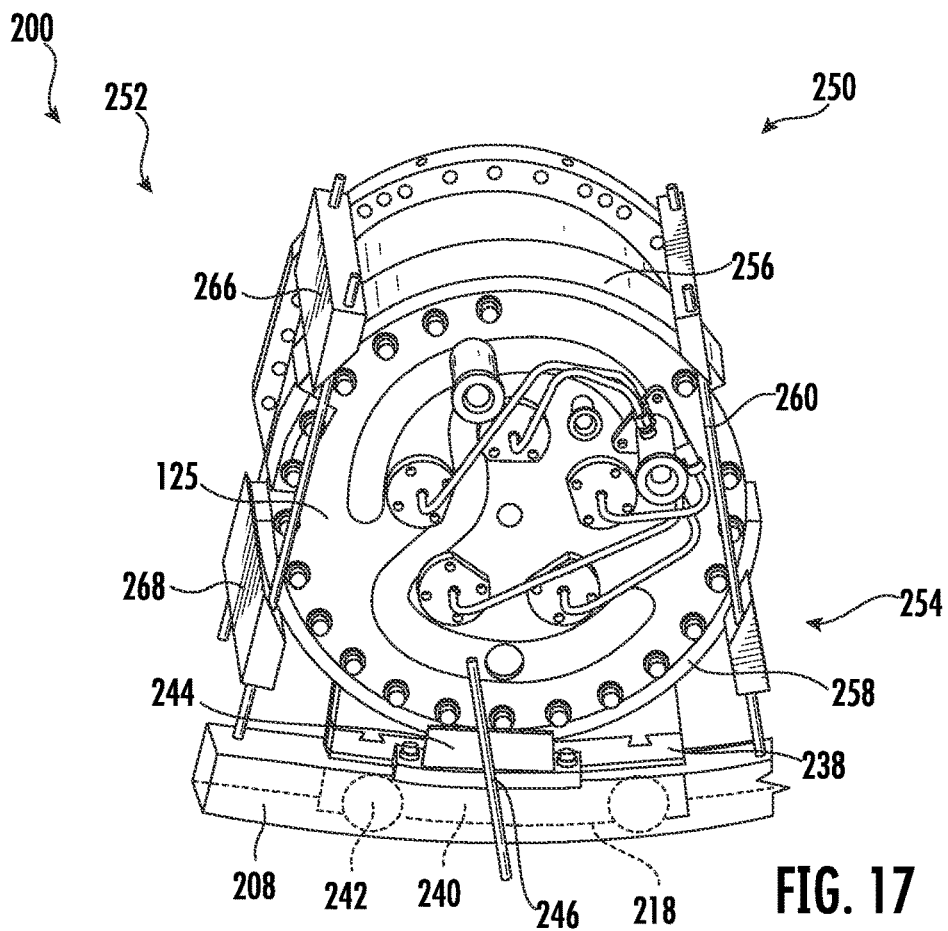
FIG. 17 illustrates an enlarged view of the system show in FIGS. 1 through 12 in accordance with embodiments of the present disclosure.

As shown, each combustion can cradle assembly 250 of the plurality of combustion can cradle assemblies 250 may include an upper assembly 252, a lower assembly 254, and one or more threaded rods 260. The upper assembly 252 may include an upper pressure plate 256 and an upper connection member 266, and the lower assembly 254 may include a lower pressure plate 258 and a lower connection member 268. As shown, both the upper pressure plate 256 and the lower pressure plate 258 may extend partially along the circumferential direction $C_{CA}$ of the combustion can cradle assembly 250. For example, both the upper pressure plate 256 and the lower pressure plate 258 may be contoured to correspond with a combustion can 125, in order to provide for flush contact between the upper and lower pressure plates 258 and the combustion can 125 (FIGS. 17 and 18).

In many embodiments, as shown in FIG. 16, the upper assembly 252 and the lower assembly 254 may be spaced apart from one another (e.g., spaced apart in the radial direction $R_{CA}$). In many embodiments, the one or more threaded rods 260 may extend between, and couple to, the upper assembly 252 and the lower assembly 254. In particular embodiments, the one or more threaded rods 260 extends between the upper connection member 266 and the lower connection member 268. As shown in FIG. 16, the upper connection member 266 and the lower connection member 268 may extend generally axially with respect to the axial centerline 207 of the combustion can assembly.

In particular embodiments, each combustion can cradle assembly 250 may include four threaded rods 260 extending between the upper assembly 252 and the lower assembly 254 (e.g., two threaded rods 260 on either side of the combustor can). In other embodiments (not shown), the cradle assembly 250 may include more or less than four threaded rods 260 (such as 2, 5, 6, or up to 10) and should not be limited to any particular number of threaded rods 260 unless specifically recited in the claims. Each of the threaded rods 260 may be coupled on both ends (e.g., coupled to the upper connection member 266 at a first end and coupled to the lower connection member 268 at a second end), such that rotation of the threaded rods 260 alters the distance between the upper and lower assemblies (e.g., a distance along the radial direction $R_{CA}$). In this way, rotation of the threaded rods 260 in a first direction may increase the radial distance between the upper and lower pressure plates 256, 258 (which may allow a combustion can to be removed from the combustion can cradle assembly 250). Similarly, rotation of the threaded rods 260 in a second direction may decrease the radial distance between the upper and lower pressure plates 256, 258 (which may allow a combustion can to be coupled to the combustion can cradle assembly 250).

As shown in FIG. 16 and FIG. 13, the drive assembly 220 may include a motor 222 (such as an electric motor, a hydraulic motor, or other suitable motor), a gearbox 236 connected to the motor 222, and one or more sprockets 232 connected to the gearbox 236. For example, the gearbox 236 may include an input shaft and an output shaft, with the input shaft connected to the motor 222 and the output shaft connected to the one or more sprockets 232. The gearbox 236 may function to transform a rotational input (e.g., input speed and torque) provided by the motor 222 to a desired rotational output (e.g., output speed and torque). Alternatively, the drive assembly 220 may be a direct drive system (e.g., not having a gearbox), such that the output shaft of the motor 222 is directly coupled to the one or more sprockets 232. The one or more sprockets 232 may be coupled to the drive chain 216, such that the rotation of the sprocket 232 causes the drive chain 216 to translationally move in the circumferential direction $C_{gt}$ of the gas turbine 10.

In many embodiments, as shown in FIGS. 13 and 16, the drive chain 216 may be at least partially housed within a chain guide railing 262. The chain guide railing 262 may be a rigid member that extends along the annular track 208. For example, the chain guide railing 262 may extend circumferentially along the entire annular track 208 around the axial centerline 21 of the gas turbine 10. In exemplary embodiments, as shown in FIGS. 13 and 16, the drive chain 216 may include connection members extending from the drive chain 216 to each cart 218 of the plurality of carts 218. The connection members may couple to each cart 218 of the plurality of carts 218 and may allow the carts 218 to move with the drive chain 216 through the annular track 208. For example, the carts 218 may be coupled to the drive chain 216 via the connection members and may move circumferentially with the drive chain 216.

Figure 19:
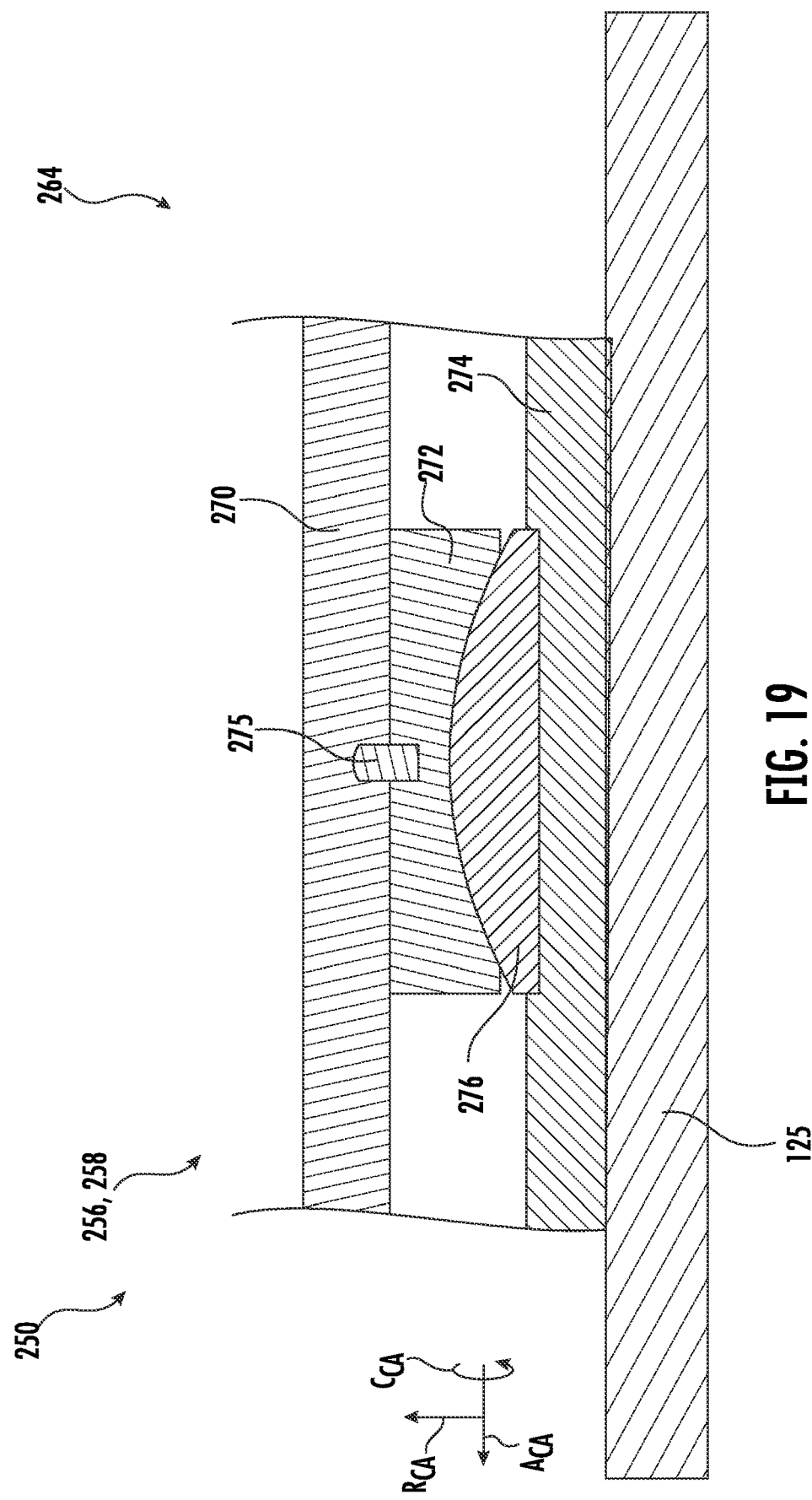
FIG. 19 illustrates a bearing assembly in accordance with embodiments of the present disclosure.
Figure 20:
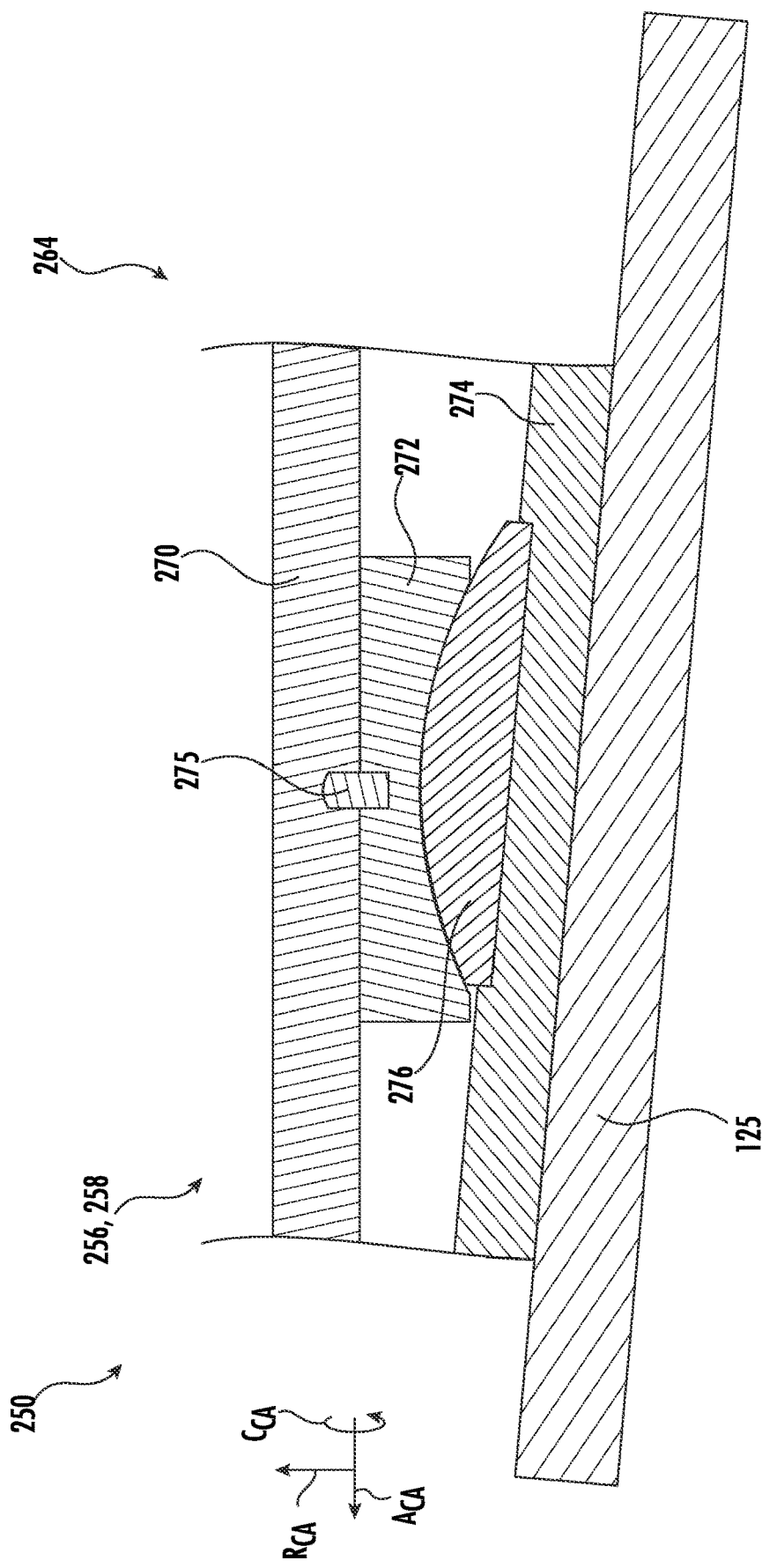
FIG. 20 illustrates the bearing assembly shown in FIG. 19 having undergone a movement in accordance with embodiments of the present disclosure.

FIGS. 19 and 20 illustrate a cross sectional view of a bearing assembly 264, which may be incorporated in one of an upper pressure plate 256 or a lower pressure plate 258 in accordance with embodiments of the present disclosure. As shown, in some embodiments, one of the upper pressure plate 256 and/or the lower pressure plate 258 may be a bearing assembly 264 that provides for movement of the combustion can cradle assembly 250 relative to the cart 218 (e.g., in one of the axial direction $A_{CA}$, the radial direction $R_{CA}$, and/or the circumferential direction $C_{CA}$). For example, FIG. 19 may be a cross section of the upper pressure plate 256 shown in FIG. 14 from along the line 19-19. For example, the bearing assembly 264 may include a top plate 270 and a concave plate 272 fixedly coupled to top plate 270 (e.g., via welding or brazing). As shown a guide key 275 may be disposed between the top plate and the concave plate for ensuring alignment. Alternatively, the top plate 270 and the concave plate 272 may be a singular member (e.g., integrally formed as a unitary body). Additionally, the bearing assembly 264 may include a bottom plate 274 and a convex plate 276 fixedly coupled to the bottom plate 274 (e.g., via welding or brazing). Alternatively, the bottom plate 274 and the convex plate 276 may be a singular member (e.g., integrally formed as a unitary body). In many embodiments, one of the base plate or the top plate 270 may contact the combustion can 125 (such as the base plate in FIGS. 19 and 20). For example, in embodiments where the upper pressure plate 256 has a bearing assembly 264 construction, the bottom plate 274 may contact the combustion can 125. Similarly, in embodiments where the lower pressure plate 258 has a bearing assembly 264 construction, the top plate 270 may contact the combustion can 125. The convex plate 276 and the concave plate 272 may be in sliding contact with one another, thereby allowing the top and bottom plates 270, 274 to move relative to one another. this movement advantageously allows the combustion can 125 to be adjusted, moved, aligned, or realigned within the combustion can cradle assembly 250 as desired. and a woven fabric disposed between and in contact with the concave plate 272 and the convex plate 276.

Referring back to FIG. 16, in embodiments where one or both of the upper pressure plate 256 and/or the lower pressure plate 258 include a bearing assembly 264 construction such as the ones shown in FIGS. 19 and 20, the combustion can cradle assembly 250 may allow the combustion can 125 to be circumferentially moved within the cradle assembly 250 (e.g., in the circumferential direction $C_{CA}$). In such embodiments, as shown, the upper assembly 252 may further include a rotation stop member 278 extending from the upper pressure plate 256. The rotation stop member 278 may extend from the upper pressure plate 256 towards the lower pressure plate 258 to prevent over-rotation of the combustion can 125. For example, when circumferentially rotating the combustion can 125, the rotation stop member 278 will eventually collide with the lower pressure plate 258, thereby preventing over-rotation.

Figure 21:
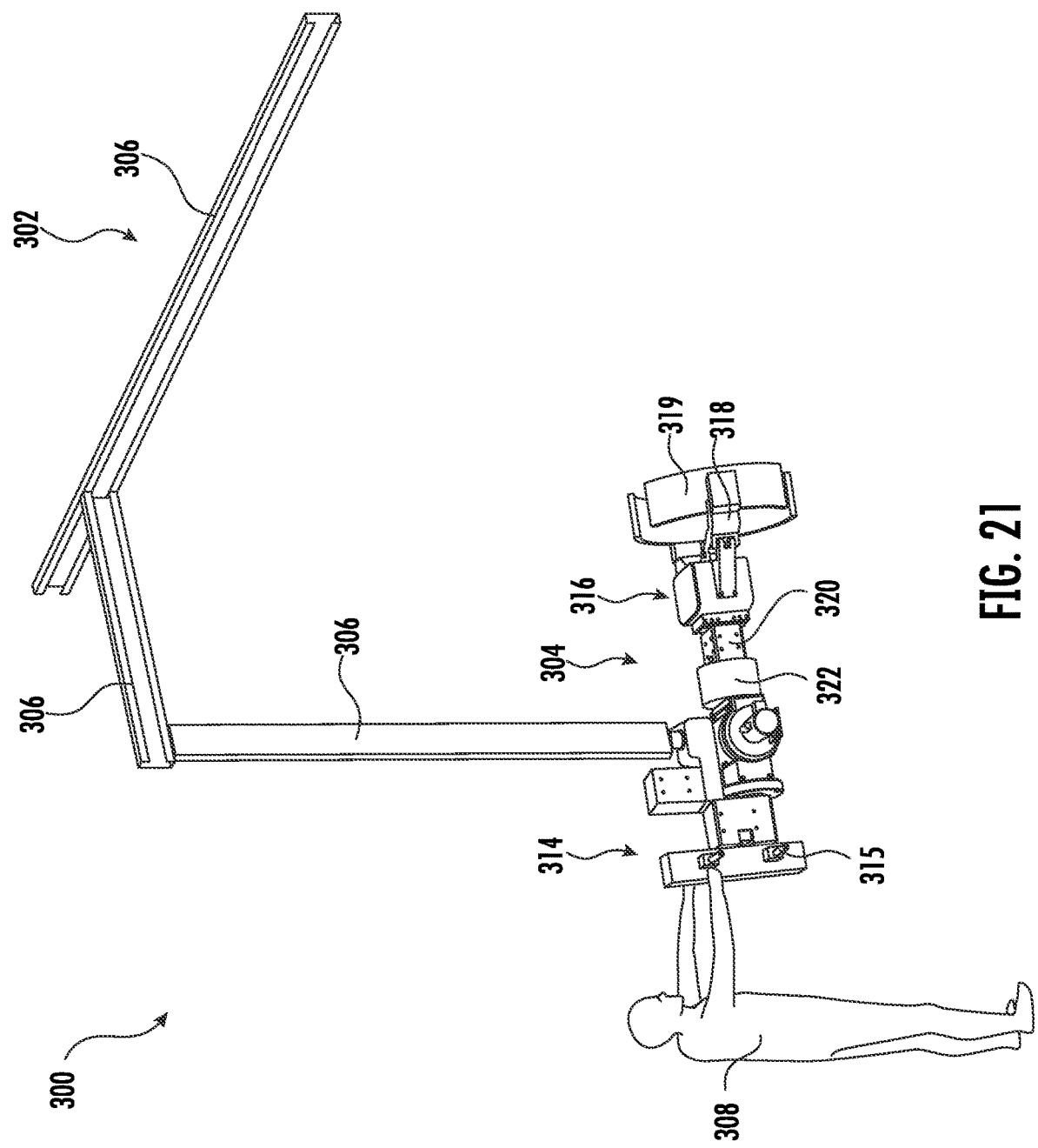
FIG. 21 illustrates a robotic system in accordance with embodiments of the present disclosure.
Figure 22:
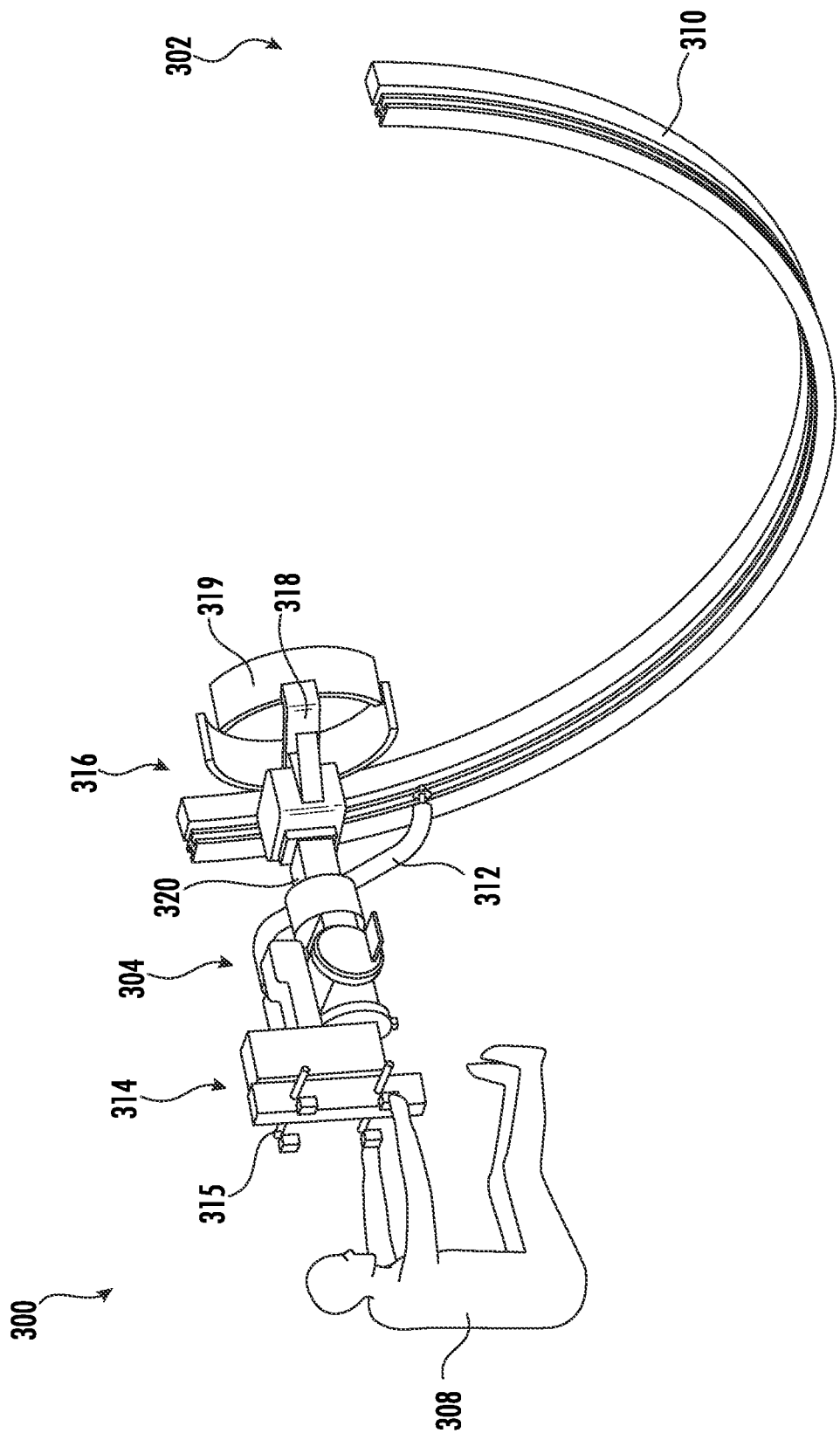
FIG. 22 illustrates a robotic system in accordance with embodiments of the present disclosure.
Figure 23:
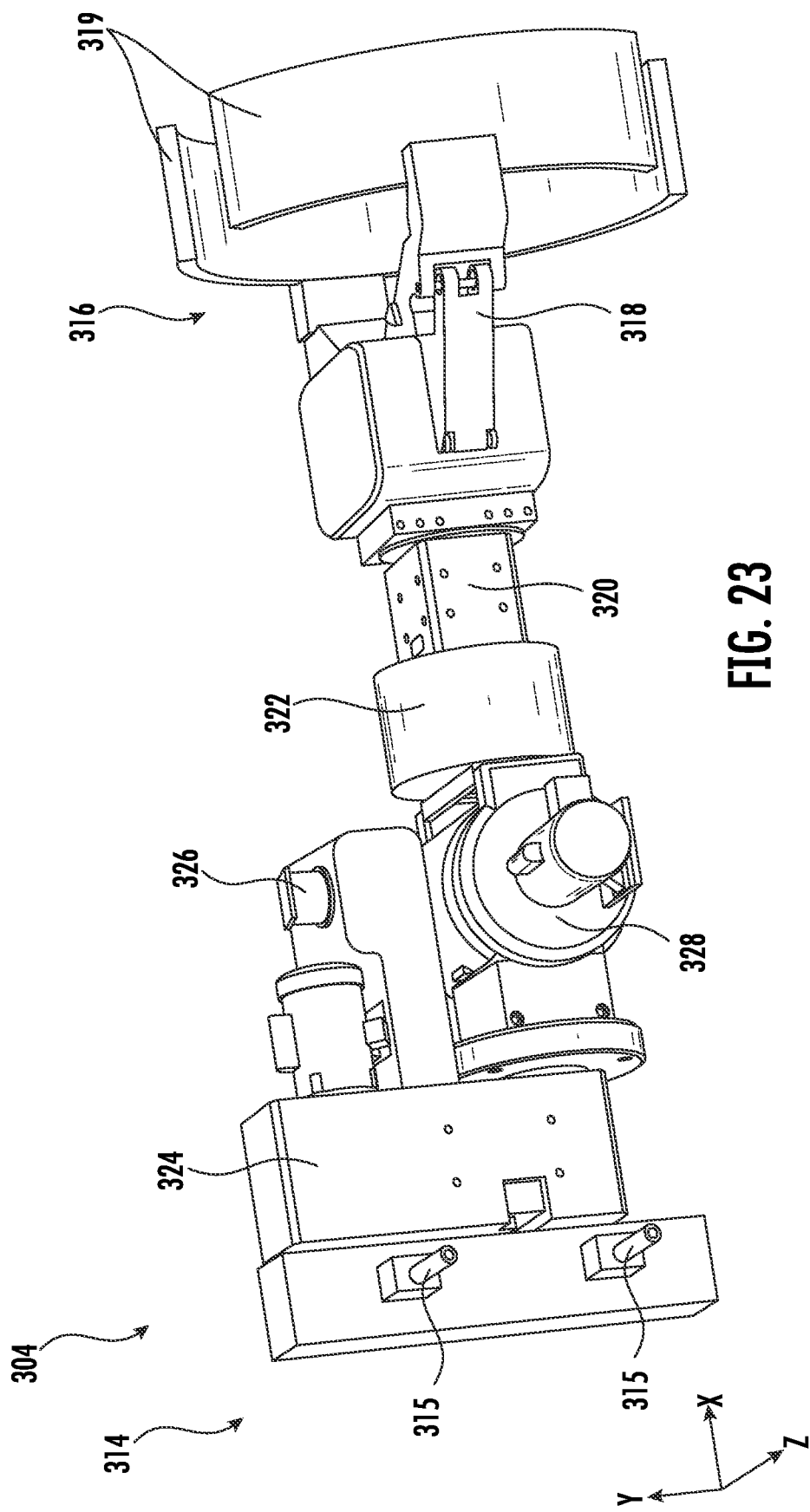
FIG. 23 illustrates a robotic arm of a robotic system in accordance with embodiments of the present disclosure.

As illustrated in FIGS. 21 through 23, the exemplary system 200 for installation or removal of one or more combustion cans 125 from a combustion section 16 of a turbomachine described above with reference to FIGS. 5 through 20 may further include or work alongside a robotic system 300. The robotic system 300 may be operable to install and/or remove one or more combustion cans 125 from a combustion section 16 of a gas turbine 10. For example, the robotic system 300 may be operable to install and/or remove a combustion can into each combustor assembly 40 of the gas turbine 10.

As shown in FIGS. 21 through 23, The robotic system 300 may include a support structure 302 and a robotic arm 304 coupled to the support structure 302. For example, as shown in FIG. 21 the support structure 302 may include one or more beams 306 that support the weight of the robotic arm 304. In exemplary embodiments, the robotic arm 304 may be translated along the one or more beams 306 (e.g., by applying a force to the robotic arm or automatically by a controller). Additionally or alternatively, as shown in FIG. 22, the support structure 302 may include a circumferentially extending track 310, and the robotic arm may be movably coupled to the circumferentially extending track 310 via a guide arm 312. The guide arm 312 and the circumferentially extending track 310 may support the weight of the robotic arm 304, and the robotic arm may be translated along the track 310 (e.g., by applying a force to the robotic arm or by operation of a controller). In this way, the support structure 302 may allow the robotic arm to be translated freely (e.g., in any direction) without requiring excessive force from the operator.

In many embodiments, the robotic arm 304 may include a gripper assembly 316 for grabbing, gripping, or removably coupling to a combustion can 125. For example, the gripper assembly 316 may include motorized jaws 318 capable of opening and closing to securely grab a combustion can 125. The gripper jaws may include combustion can jaws 319 that are contoured to correspond with the shape of the combustion can 125 (to facilitate the gripping thereof). Additionally, the robotic arm 304 may include a gripper motor 320 coupled to the gripper assembly 316 for opening and closing the motorized jaws 318.

In exemplary embodiments of the robotic system 300, in addition to the robotic arm 304 being free to translate in any direction (e.g., via the support structure 302 described hereinabove), the robotic arm may also be configured to rotate the gripper assembly 316 in any direction (thereby allowing for rotation of a combustion can 125). For example, as shown in FIG. 23, the robotic arm 304 may define an orthogonal coordinate system an X direction, a Y direction, and a Z direction mutually perpendicular to one another. For example, the robotic arm 304 may include a helical spur gearmotor 324 (such as a parallel shaft mounted helical spur gearmotor). The helical spur gearmotor 324 may be mounted to a steering assembly 314 and may provide for rotation about the X direction. Additionally, the robotic arm 304 may include a cylindrical joint 326 that provides for rotation about the Y direction. Furthermore, the robotic arm 304 may further include a motorized hinge 328 that provides for rotation about the Z direction. As shown, the robotic arm 304 may include a pneumatic cylinder 322 disposed between the gripper motor 320 and the motorized hinge 328. The pneumatic cylinder 322 may provide for translation along the X direction.

The robotic system 300 may be user controlled (such as by operator 308). For example, the robotic arm may include a steering assembly 314 having one or more handlebars 315. The steering assembly 314 may be operated by a user to control a position of the robotic arm (e.g., along the support structure 302). In some embodiments, the steering assembly 314 may a human-machine or user interface for displaying message windows and/or alerts to the operator and/or for allowing the operator to interface with the robotic system's 300 controller or computing system. In some embodiments, the user interface may include joysticks, buttons, knobs and/or any other suitable input devices that allow the operator to provide user inputs to an associated controller or computing system, including wifi (unwired) or wired remote control. Operator may have full control whether close or far away from robotic system 300 during full operator vision to mange or control combustion cans handling or operation.

In alternative embodiments, the robotic system 300 may be entirely controlled by a computerized operating system (e.g., a controller). In general, the computing system that may control the robotic system 300 may correspond to any suitable processor-based device(s), such as a computing device or any combination of computing devices. Thus, the computing system may generally include one or more processor(s) and associated memory devices configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device may generally be configured to store information accessible to the processor(s), including data that can be retrieved, manipulated, created and/or stored by the processor(s) and instructions that can be executed by the processor(s).

Figure 24:
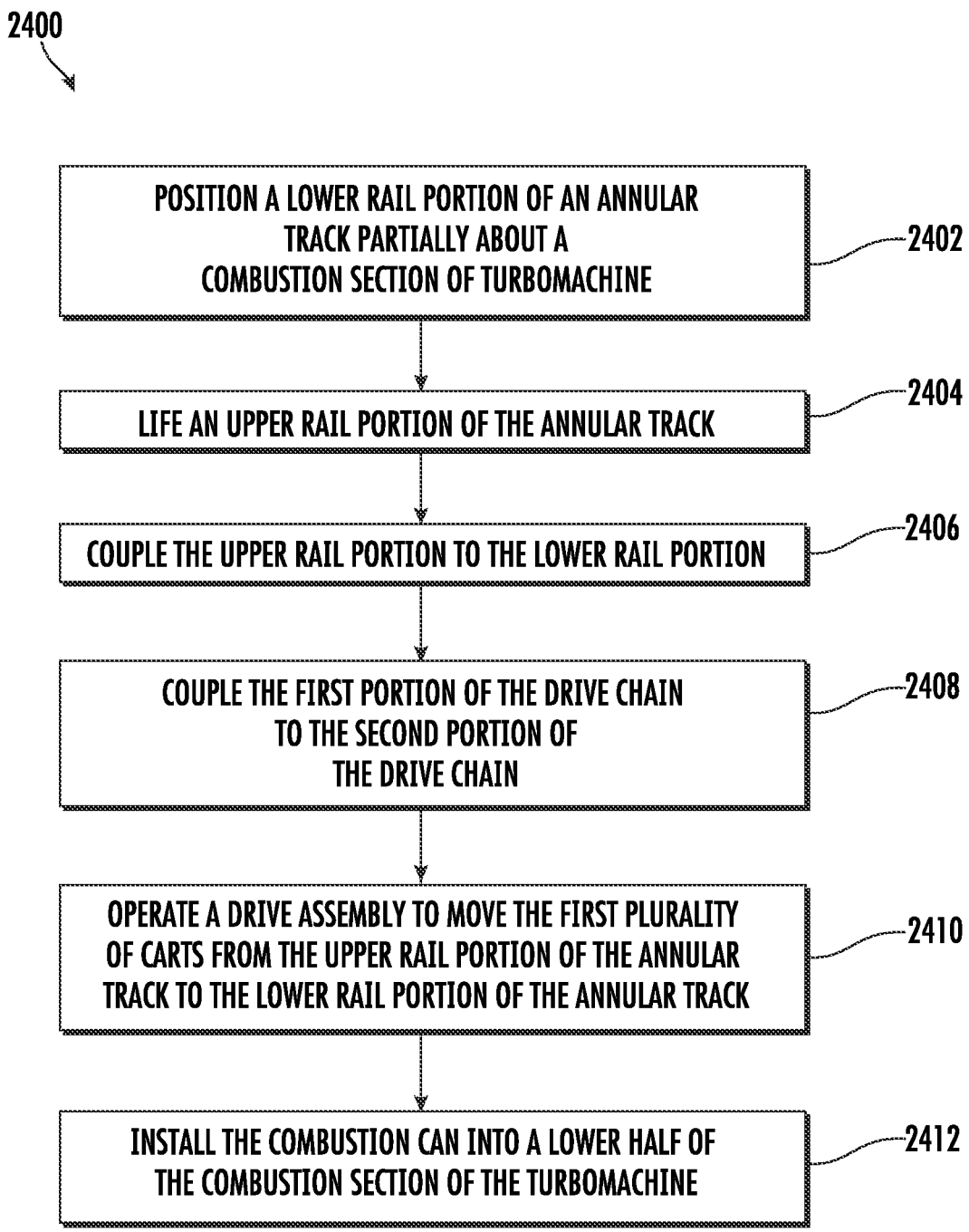
FIG. 24 illustrates a flow chart of a method for installation of one or more combustion cans from a combustion section of turbomachine in accordance with embodiments of the present disclosure.
Figure 25A:
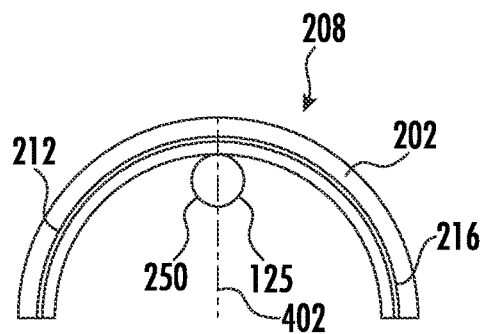
FIGS. 25A through 25G each illustrates an upper rail portion of a track assembly carrying one or more combustion cans in accordance with embodiments of the present disclosure.
Figure 25B:
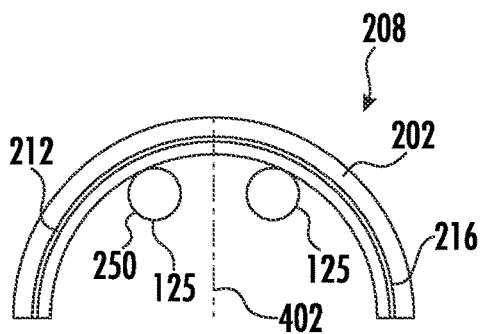
Figure 25C:
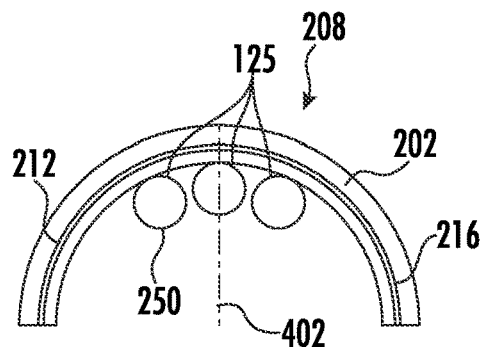
Figure 25D:
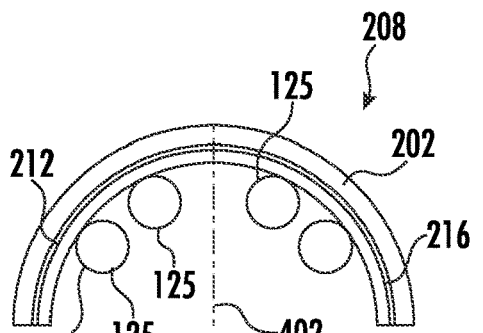
Figure 25E:
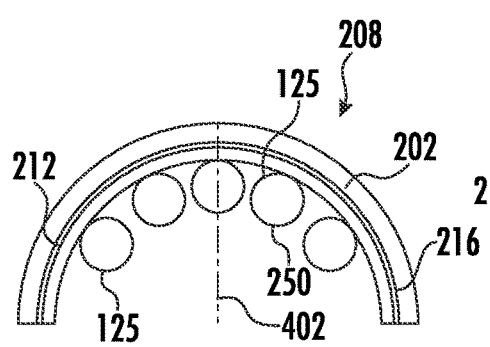
Figure 25F:
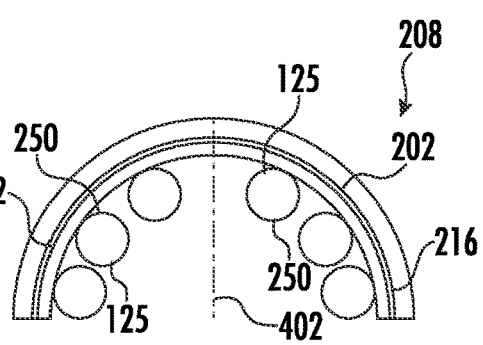
Figure 25G:
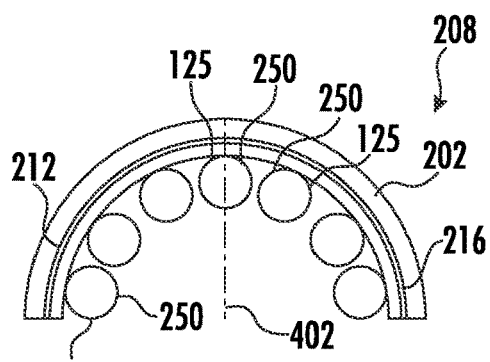

Referring now to FIG. 24, a flow diagram of one embodiment of a method 2400 installation of one or more combustion cans 125 from a combustion section 16 of a turbomachine (such as the gas turbine 10) in accordance with aspects of the present subject matter. In general, the method 2400 will be described herein with reference to the system 200 and the gas turbine 10 described above with reference to FIGS. 1 through 20. However, it will be appreciated by those of ordinary skill in the art that the disclosed method 2400 may generally be utilized with any suitable turbomachine and/or may be utilized in connection with a system having any other suitable system configuration. In addition, although FIG. 24 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown, the method 2400 may include an initial step 2402 of positioning a lower rail portion 204 of an annular track partially about a combustion section 16 of a turbomachine (such as the gas turbine 10). As discussed above, a second portion 214 (or second half) of a drive chain 216 may extends along the lower rail portion 204. As shown, in FIGS. 1-11, the lower rail portion may be positioned about the lower half of the gas turbine 10 (e.g., below the horizontal plane 206 that divides the turbine 10 into an upper half and a lower half). For example, the lower rail may be lifted by a crane or other lifting means and rested on the one or more vertical legs 210 (such as in the position shown in FIG. 5)

In exemplary embodiments, the method 2400 may further include a step 2404 of lifting an upper rail portion 202 of the annular track 208. As discussed above in more detail, a first portion 212 of the drive chain 216 may extends along the upper rail portion 202. A first plurality of carts 218 are movably coupled to the upper rail portion 202 and coupled to the first portion 212 of the drive chain 216. Each cart 218 of the first plurality of carts 218 may be coupled to a combustion can cradle assembly 250 in a first plurality of combustion can cradle assemblies 250. Each combustion can cradle assembly 250 in the first plurality of combustion can cradle assemblies 250 being removably coupled to a combustion can 125 in a first plurality 124 of combustion cans 125.

The method may include a step 2406 of coupling the upper rail portion 202 to the lower rail portion 204. Coupling the upper rail portion 202 to the lower rail portion 204 may form the annular track 208 that entirely surrounds the combustion section 16 of the gas turbine. Additionally, the method may include a step 2408 of coupling the first portion 212 of the drive chain 216 to the second portion 214 of the drive chain 216. This will provide a single continuous drive chain 216 that extends entirely circumferentially around the combustion section 16 of the gas turbine 10.

In various embodiments, the method may include a step 2410 of operating a drive assembly 220 to move the first plurality of carts 218 from the upper rail portion 202 of the annular track 208 to the lower rail portion 204 of the annular track 208. For example, the drive assembly 220 may include a motor 222 operably connected to the drive chain 216 via one or more sprockets 232, such that operation of the motor 222 moves the drive chain 216 along the annular track 208. In exemplary embodiments, the method may include a step 2412 of installing the first plurality 124 of combustion cans 125 into a lower half of the combustion section 16 of the turbomachine. For example, each combustion can 125 may be installed into a respective combustor assembly 40 disposed in the lower half of the combustion section 16 (e.g., below the horizontal plane 206).

Once the first plurality 124 of combustion cans 125 have been installed in the lower half of the combustion section 16, the method 2400 may further include decoupling the first portion 212 of the drive chain 216 to the second portion 214 of the drive chain 216 (e.g., when the portions 212, 214 are positioned along one of the upper rail portion 202 or the lower rail portion 204). Additionally, the method 2400 may include decoupling the upper rail portion 202 from the lower rail portion 202. Subsequently, the upper rail portion 202 may be lifted and lowered (e.g., via a crane or other suitable lifting means) to the ground or floor, where a second plurality 126 of combustion cans 125 may be coupled to the upper rail portion 202.

In exemplary embodiments, the method 2400 may further include lifting the upper rail portion 202 of the annular track 208 (e.g., for a second time to complete the installation of combustion cans 125 into the combustion section 16). During the second lift, second plurality of carts 218 may be movably coupled to the upper rail portion 202 and coupled to the first portion 212 of the drive chain 216. Each cart 218 of the second plurality of carts 218 may be coupled to a combustion can cradle assembly 250 in a second plurality of combustion can cradle assemblies 250. Each combustion can cradle assembly 250 in the second plurality of combustion can cradle assemblies 250 may be coupled to a second combustion can 125 of a second plurality 126 combustion cans 125. In many embodiments, the method 2400 may further include coupling the upper rail portion 202 to the lower rail portion 204. Coupling the upper rail portion 202 to the lower rail portion 204 may form the annular track 208 that entirely surrounds the combustion section 16 of the gas turbine. In many embodiments, the method 2400 may include installing the second plurality 126 of combustion cans 125 into an upper half (e.g., above the horizontal plane 206) of the combustion section 16 of the turbomachine. For example, each combustion can 125 in the second plurality of combustion cans 125 may be installed into a respective combustor assembly 40 disposed in the upper half of the combustion section 16 (e.g., above the horizontal plane 206).

As provided hereinabove, the method 2400 and system 200 described herein provide a compact, safe, and efficient design for installation and removal of one or more combustion cans 125 from the combustion section 16 of a gas turbine. For example, although FIGS. 5 through 12 illustrate a sequential process of utilizing the system 200 for installing all the combustion cans 125 into the combustion section 16, it should be appreciated that the system 200 described herein may be utilized for installation or removal of any number of combustion cans 125 in any position on the gas turbine 10.

Referring now to FIGS. 25A through 25G, each of which illustrate an upper rail portion 202 of the annular track 208 carrying one or more combustion cans 125. As shown, one or more combustion cans 125 may arranged within the upper rail portion 202 to uniformly distribute the weight and keep the upper rail portion 202 upright when in use. For example, each of the circles illustrated in FIGS. 25A through 25G may represent a combustion can 125 removably coupled to a respective combustion can cradle assembly 250. As shown, the upper rail portion 202 may define a vertical lifting axis 402 along which an upward lifting force may be applied to move the upper rail portion 202 and the plurality of combustion cans 125. In such embodiments, the one or more combustion cans 125 may be arranged equally on either side of the vertical lifting axis 402, in order to keep the upper rail portion 202 of the annular track 208 in an upright position when it is being moved. Additionally or alternatively, when lifting and/or moving the upper rail portion 202 of the annular track 208 along the vertical lifting axis 402, one or more counterweights may be utilized to equalize the distribution of weight within the upper rail portion 202 (e.g., instead of or in addition to the one or more combustion cans 125).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A system for installation or removal of one or more combustion cans from a combustion section of a turbomachine, the system comprising: an annular track surrounding the turbomachine, the annular track including an upper rail portion and a lower rail portion removably coupled to one another; a drive assembly operably coupled to the annular track, the drive assembly including a drive chain extending along the annular track; a plurality of carts rotatably coupled to the annular track and connected to the drive chain such that operation of the drive assembly alters a circumferential position of the plurality of carts with respect to an axial centerline of the turbomachine; and a plurality of combustion can cradle assemblies each coupled to a respective cart of the plurality of carts, and wherein each combustion can cradle assembly of the plurality of combustion can cradle assemblies is configured to removably couple to a combustion can of the one or more combustion cans.

The system of one or more of these clauses, wherein the cart includes one or more wheels rotatably coupled to the cart.

The system of one or more of these clauses, wherein the cart includes a main body and a track member extending from the main body and into the annular track, and wherein the one or more wheels is coupled to the track member.

The system of one or more of these clauses, wherein the cart includes a tab portion extending from the main body, and wherein a jacking bolt extends through the tab portion and into the combustion can cradle assembly such that rotation of the jacking bolt adjusts an axial position of the combustion can cradle assembly.

The system of one or more of these clauses, wherein the drive assembly includes a motor and one or more sprockets coupled to the drive chain such that operation of the motor alters a circumferential position of the plurality of carts with respect to an axial centerline of the turbomachine.

The system of one or more of these clauses, wherein the drive assembly includes a gearbox connected to the motor and connected to the one or more sprockets.

The system of one or more of these clauses, wherein the drive chain includes connection members extending from the drive chain to each cart of the plurality of carts.

The system of one or more of these clauses, wherein each combustion can cradle assembly of the plurality of combustion can cradle assemblies defines a cylindrical coordinate system having an axial direction, a radial direction, and a circumferential direction, and wherein each combustion can cradle assembly of the plurality of combustion can cradle assemblies is configured to move along any of the axial direction, the radial direction, or the circumferential direction relative to the annular track.

The system of one or more of these clauses, wherein each combustion can cradle assembly of the plurality of combustion can cradle assemblies comprises an upper assembly, a lower assembly, and one or more threaded rods extending between the upper assembly and the lower assembly.

The system of one or more of these clauses, wherein the upper assembly includes an upper pressure plate and an upper connection member, wherein the lower assembly includes a lower pressure plate and a lower connection member, and wherein the one or more threaded rods extends between the upper connection member and the lower connection member.

The system of one or more of these clauses, wherein the upper assembly includes a rotation stop member extending from the upper pressure plate.

The system of one or more of these clauses, wherein the upper pressure plate and the lower pressure plate are contoured to correspond with a combustion can of the one or more combustion cans.

The system of one or more of these clauses, wherein one of the upper pressure plate or the lower pressure plate is a bearing assembly that provides for movement of the combustion can cradle assembly relative to the cart.

The system of one or more of these clauses, wherein the bearing assembly includes a top plate, a concave plate fixedly coupled to top plate, a bottom plate, a convex plate fixedly coupled to the bottom plate, and a woven fabric disposed between and in contact with the concave plate and the convex plate.

A method for installation of one or more combustion cans from a combustion section of turbomachine, the method comprising: positioning a lower rail portion of an annular track partially about a combustion section of a turbomachine, wherein a second portion of a drive chain extends along the lower rail portion; lifting an upper rail portion of the annular track, wherein a first portion of the drive chain extends along the upper rail portion, a first plurality of carts movably coupled to the upper rail portion and coupled to the first portion of the drive chain, each cart of the first plurality of carts coupled to a respective combustion can cradle assembly in a first plurality of combustion can cradle assemblies, wherein each combustion can cradle assembly in the first plurality of combustion can cradle assemblies is removably coupled to a combustion can in a first plurality of combustion cans; coupling the upper rail portion to the lower rail portion; coupling the first portion of the drive chain to the second portion of the drive chain; operating a drive assembly to move the first plurality of carts from the upper rail portion of the annular track to the lower rail portion of the annular track; and installing the first plurality of combustion cans into a lower half of the combustion section of the turbomachine.

The method of one or more of these clauses, further comprising: decoupling the first portion of the drive chain to the second portion of the drive chain; and decoupling the upper rail portion from the lower rail portion.

The method of one or more of these clauses, further comprising: lifting the upper rail portion of the annular track, a second plurality of carts movably coupled to the upper rail portion and coupled to the first portion of the drive chain, each cart of the second plurality of carts coupled to a respective combustion can cradle assembly in a second plurality of combustion can cradle assemblies, wherein each combustion can cradle assembly in the second plurality of combustion can cradle assemblies is removably coupled to a combustion can in a second plurality of combustion cans.

The method of one or more of these clauses, further comprising: coupling the upper rail portion to the lower rail portion; and installing the second plurality of combustion cans into an upper half of the combustion section of the turbomachine.

What is claimed is:

1. A system for installation or removal of one or more combustion cans from a combustion section of a turbomachine, the system comprising:
    an annular track surrounding the turbomachine, the annular track including an upper rail portion and a lower rail portion removably coupled to one another;
    a drive assembly operably coupled to the annular track, the drive assembly including a drive chain extending along the annular track;
    a plurality of carts rotatably coupled to the annular track and connected to the drive chain such that operation of the drive assembly alters a circumferential position of the plurality of carts with respect to an axial centerline of the turbomachine; and
    a plurality of combustion can cradle assemblies each coupled to a respective cart of the plurality of carts, and wherein each combustion can cradle assembly of the plurality of combustion can cradle assemblies is configured to removably couple to a combustion can of the one or more combustion cans, wherein each combustion can cradle assembly of the plurality of combustion can cradle assemblies comprises an upper assembly, a lower assembly, and one or more threaded rods extending between the upper assembly and the lower assembly.

2. The system of claim 1, wherein the cart includes one or more wheels rotatably coupled to the cart.

3. The system of claim 2, wherein the cart includes a main body and a track member extending from the main body and into the annular track, and wherein the one or more wheels is coupled to the track member.

4. The system of claim 3, wherein the cart includes a tab portion extending from the main body, and wherein a jacking bolt extends through the tab portion and into the combustion can cradle assembly such that rotation of the jacking bolt adjusts an axial position of the combustion can cradle assembly.

5. The system of claim 1, wherein the drive assembly includes a motor and one or more sprockets coupled to the drive chain such that operation of the motor alters a circumferential position of the plurality of carts with respect to an axial centerline of the turbomachine.

6. The system of claim 5, wherein the drive assembly includes a gearbox connected to the motor and connected to the one or more sprockets.

7. The system of claim 1, wherein the drive chain includes connection members extending from the drive chain to each cart of the plurality of carts.

8. The system of claim 1, wherein each combustion can cradle assembly of the plurality of combustion can cradle assemblies defines a cylindrical coordinate system having an axial direction, a radial direction, and a circumferential direction, and wherein each combustion can cradle assembly of the plurality of combustion can cradle assemblies is configured to move along any of the axial direction, the radial direction, or the circumferential direction relative to the annular track.

9. The system of claim 1, wherein the upper assembly includes an upper pressure plate and an upper connection member, wherein the lower assembly includes a lower pressure plate and a lower connection member, and wherein the one or more threaded rods extends between the upper connection member and the lower connection member.

10. The system of claim 9, wherein the upper assembly includes a rotation stop member extending from the upper pressure plate.

11. The system of claim 9, wherein the upper pressure plate and the lower pressure plate are contoured to correspond with a combustion can of the one or more combustion cans.

12. The system of claim 9, wherein one of the upper pressure plate or the lower pressure plate is a bearing assembly that provides for movement of the combustion can cradle assembly relative to the cart.

13. The system of claim 12, wherein the bearing assembly includes a top plate, a concave plate fixedly coupled to top plate, a bottom plate, a convex plate fixedly coupled to the bottom plate, and a woven fabric disposed between and in contact with the concave plate and the convex plate.

14. A method for installation of one or more combustion cans from a combustion section of turbomachine, the method comprising:
positioning a lower rail portion of an annular track partially about a combustion section of a turbomachine, wherein a second portion of a drive chain extends along the lower rail portion;
lifting an upper rail portion of the annular track, wherein a first portion of the drive chain extends along the upper rail portion, a first plurality of carts movably coupled to the upper rail portion and coupled to the first portion of the drive chain, each cart of the first plurality of carts coupled to a respective combustion can cradle assembly in a first plurality of combustion can cradle assemblies, wherein each combustion can cradle assembly in the first plurality of combustion can cradle assemblies is removably coupled to a combustion can in a first plurality of combustion cans, wherein each combustion can cradle assembly of the plurality of combustion can cradle assemblies comprises an upper assembly, a lower assembly, and one or more threaded rods extending between the upper assembly and the lower assembly;
coupling the upper rail portion to the lower rail portion;
coupling the first portion of the drive chain to the second portion of the drive chain;
operating a drive assembly to move the first plurality of carts from the upper rail portion of the annular track to the lower rail portion of the annular track; and
installing the first plurality of combustion cans into a lower half of the combustion section of the turbomachine.

15. The method of claim 14, further comprising:
decoupling the first portion of the drive chain to the second portion of the drive chain; and
decoupling the upper rail portion from the lower rail portion.

16. The method of claim 15, further comprising:
lifting the upper rail portion of the annular track, a second plurality of carts movably coupled to the upper rail portion and coupled to the first portion of the drive chain, each cart of the second plurality of carts coupled to a respective combustion can cradle assembly in a second plurality of combustion can cradle assemblies, wherein each combustion can cradle assembly in the second plurality of combustion can cradle assemblies is removably coupled to a combustion can in a second plurality of combustion cans.

17. The method of claim 16, further comprising:
coupling the upper rail portion to the lower rail portion; and
installing the second plurality of combustion cans into an upper half of the combustion section of the turbomachine.

18. A system for installation or removal of one or more combustion cans from a combustion section of a turbomachine, the system comprising:
an annular track surrounding the turbomachine, the annular track including an upper rail portion and a lower rail portion removably coupled to one another;
a drive assembly operably coupled to the annular track, the drive assembly including a drive chain extending along the annular track;
a plurality of carts rotatably coupled to the annular track and connected to the drive chain such that operation of the drive assembly alters a circumferential position of the plurality of carts with respect to an axial centerline of the turbomachine; and
a plurality of combustion can cradle assemblies each coupled to a respective cart of the plurality of carts, and wherein each combustion can cradle assembly of the plurality of combustion can cradle assemblies is configured to removably couple to a combustion can of the one or more combustion cans, wherein each combustion can cradle assembly of the plurality of combustion can cradle assemblies defines a cylindrical coordinate system having an axial direction, a radial direction, and a circumferential direction, and wherein each combustion can cradle assembly of the plurality of combustion can cradle assemblies is configured to move along any of the axial direction, the radial direction, or the circumferential direction relative to the annular track.

* * * * *